US010452041B2

(12) United States Patent
Menon et al.

(10) Patent No.: US 10,452,041 B2
(45) Date of Patent: Oct. 22, 2019

(54) GAS TURBINE DISPATCH OPTIMIZER REAL-TIME COMMAND AND OPERATIONS

(71) Applicant: General Electric Company, New York, NY (US)

(72) Inventors: Anup Menon, Guilderland, NY (US); Sree Rama Raju Vetukuri, Philadelphia, PA (US); Olugbenga Anubi, Glenville, NY (US); Justin John, Cohoes, NY (US); Marc Gavin Lindenmuth, Atlanta, GA (US); Aditya Kumar, Schenectady, NY (US); Ruijie Shi, Clifton Park, NY (US); Jonathan Thatcher, Pendleton, SC (US)

(73) Assignee: General Electric Company, New York, NY (US)

( * ) Notice: Subject to any disclaimer, the term of this patent is extended or adjusted under 35 U.S.C. 154(b) by 77 days.

(21) Appl. No.: 15/476,124

(22) Filed: Mar. 31, 2017

(65) Prior Publication Data

US 2018/0284707 A1   Oct. 4, 2018

(51) Int. Cl.
*G05B 19/042* (2006.01)
*F02C 9/28* (2006.01)

(52) U.S. Cl.
CPC .............. *G05B 19/042* (2013.01); *F02C 9/28* (2013.01); *F05D 2270/07* (2013.01); *F05D 2270/20* (2013.01); *G05B 2219/2639* (2013.01)

(58) Field of Classification Search
CPC . G05B 19/042; G05B 2219/2639; F02C 9/28; F02C 9/00; F05D 2270/07; F05D 2270/20; F01D 15/10
(Continued)

(56) References Cited

U.S. PATENT DOCUMENTS 5,048,285 A    9/1991  Schmitt et al.
6,038,540 A    3/2000  Krist et al.
(Continued)

FOREIGN PATENT DOCUMENTS

WO    2015042123    3/2015

OTHER PUBLICATIONS

Li, Donglin, "Life Extending Control by a Variance Constrained MPC Approach," World Congress, 2005, vol. 16 Part 1, Alberta Energy Research Institute. Dept. of Electrical and Computer Engineering, University of Alberta, Syncrude Canada Ltd.
(Continued)

*Primary Examiner* — Brian W Wathen
*Assistant Examiner* — Alicia M. Choi
(74) *Attorney, Agent, or Firm* — Amin, Turocy & Watson, LLP

(57) ABSTRACT

A dispatch optimization system leverages ambient and market forecast data as well as asset performance and parts-life models to generate recommended operating schedules for gas turbines or other power-generating plant assets that substantially maximize profit while satisfying parts-life constraints. The system generates operating profiles that balance optimal peak fire opportunities with optimal cold part-load opportunities within a maintenance interval or other operating horizon. During real-time operation of the assets, the optimization system can update the operating schedule based on actual market, ambient, and operating data. The system provides information that can assist operators in determining suitable conditions in which to cold part-load or peak-fire the assets in an optimally profitable manner without violating target life constraints.

20 Claims, 26 Drawing Sheets

(58) Field of Classification Search
USPC .......................................................... 700/287
See application file for complete search history.

(56) References Cited

U.S. PATENT DOCUMENTS

| | | | |
|---|---|---|---|
| 6,591,225 B1 | 7/2003 | Adelman et al. | |
| 6,804,612 B2 | 10/2004 | Chow et al. | |
| 7,058,552 B2 | 6/2006 | Stothert et al. | |
| 7,203,554 B2 | 4/2007 | Fuller | |
| 7,356,383 B2 | 4/2008 | Pechtl et al. | |
| 7,377,115 B2 | 5/2008 | Adibhatla | |
| 7,822,577 B2 | 10/2010 | Sathyanarayana et al. | |
| 8,311,681 B1 | 11/2012 | Marcus | |
| 8,327,538 B2 | 12/2012 | Wang et al. | |
| 8,755,916 B2 | 6/2014 | Lou | |
| 8,892,264 B2 | 11/2014 | Steven et al. | |
| 9,098,876 B2 | 8/2015 | Steven et al. | |
| 9,159,042 B2 | 10/2015 | Steven et al. | |
| 9,159,108 B2 | 10/2015 | Steven et al. | |
| 9,171,276 B2 | 10/2015 | Steven et al. | |
| 9,367,825 B2 | 6/2016 | Steven et al. | |
| 9,404,426 B2 | 8/2016 | Wichmann et al. | |
| 2002/0120412 A1* | 8/2002 | Hayashi ................... G05F 1/66 | |
| | | | 702/61 |
| 2003/0055664 A1* | 3/2003 | Suri ........................ G06Q 40/04 | |
| | | | 705/37 |
| 2004/0093298 A1 | 5/2004 | McClure et al. | |
| 2006/0253268 A1* | 11/2006 | Antoine ................ G06Q 10/063 | |
| | | | 702/184 |
| 2010/0106332 A1* | 4/2010 | Chassin ................ G06Q 20/102 | |
| | | | 700/278 |
| 2011/0037276 A1* | 2/2011 | Hoffmann ................. F02C 9/22 | |
| | | | 290/40 C |
| 2011/0106747 A1 | 5/2011 | Singh et al. | |
| 2012/0083933 A1 | 4/2012 | Subbu et al. | |
| 2012/0191262 A1 | 7/2012 | Marcus | |
| 2012/0271593 A1* | 10/2012 | Uluyol .................... F03D 7/048 | |
| | | | 702/179 |
| 2012/0283963 A1 | 11/2012 | Mitchell et al. | |
| 2013/0035798 A1* | 2/2013 | Zhou ..................... F03D 7/0292 | |
| | | | 700/287 |
| 2013/0047613 A1 | 2/2013 | Holt et al. | |
| 2014/0058534 A1 | 2/2014 | Tiwari et al. | |
| 2014/0129187 A1 | 5/2014 | Mazzaro et al. | |
| 2014/0288855 A1* | 9/2014 | Deshpande ............. F03D 17/00 | |
| | | | 702/34 |
| 2015/0081121 A1 | 3/2015 | Morgan et al. | |
| 2015/0106058 A1 | 4/2015 | Mazzaro et al. | |
| 2015/0167637 A1* | 6/2015 | Kooijman ................. F03D 7/02 | |
| | | | 416/1 |
| 2015/0184549 A1 | 7/2015 | Pamujula et al. | |
| 2015/0184550 A1 | 7/2015 | Wichmann et al. | |
| 2015/0185716 A1 | 7/2015 | Wichmann et al. | |
| 2015/0355606 A1 | 12/2015 | Chillar et al. | |
| 2016/0160762 A1 | 6/2016 | Chandra et al. | |
| 2016/0258361 A1 | 9/2016 | Tiwari et al. | |
| 2016/0258363 A1 | 9/2016 | Tiwari et al. | |
| 2016/0261115 A1 | 9/2016 | Asati et al. | |
| 2016/0281607 A1* | 9/2016 | Asati ......................... F02C 9/28 |
| 2017/0002796 A1* | 1/2017 | Spruce .................. F03D 7/0292 |
| 2017/0285595 A1* | 10/2017 | Wenus ................. G05B 19/042 |
| 2018/0187648 A1* | 7/2018 | Spruce .................... F03D 7/028 |
| 2018/0187649 A1* | 7/2018 | Spruce .................. F03D 7/0292 |

OTHER PUBLICATIONS

Li, D, "Life Extending Control of Boiler—Turbine Systems via Model Predictive Methods," Control Engineering Practice 2006, vol. 14, pp. 319-326, Department of Electrical & Computer Engineering, University of Alberta, Edmunton, Syncrude Canada Ltd.
Non-Final Office Action received for U.S. Appl. No. 15/483,574 dated Jul. 16, 2019, 38 pages.

* cited by examiner

PERFORMANCE MODEL DATA

802 ⟶

| | POWER OUTPUT | | | |
|---|---|---|---|---|
| OPERATING TEMPERATURE | 80MW | 90MW | 100MW | 110MW |
| 1040 F | FuelUsed(80,1040) | FuelUsed(90,1040) | FuelUsed(100,1040) | FuelUsed(110,1040) |
| 1050F | FuelUsed(80,1050) | FuelUsed(90,1050) | FuelUsed(100,1050) | FuelUsed(110,1050) |
| 1060F | FuelUsed(80,1060) | FuelUsed(90,1060) | FuelUsed(100,1060) | FuelUsed(110,1060) |
| 1070F | FuelUsed(80,1070) | FuelUsed(90,1070) | FuelUsed(100,1070) | FuelUsed(110,1070) |

⋮

PARTS-LIFE MODEL DATA

804 ⟶

| | POWER OUTPUT | | | |
|---|---|---|---|---|
| OPERATING TEMPERATURE | 80MW | 90MW | 100MW | 110MW |
| 1040 F | FFH_consumed(80,1040) | FFH_consumed(90,1040) | FFH_consumed(100,1040) | FFH_consumed(110,1040) |
| 1050F | FFH_consumed(80,1050) | FFH_consumed(90,1050) | FFH_consumed(100,1050) | FFH_consumed(110,1050) |
| 1060F | FFH_consumed(80,1060) | FFH_consumed(90,1060) | FFH_consumed(100,1060) | FFH_consumed(110,1060) |
| 1070F | FFH_consumed(80,1070) | FFH_consumed(90,1070) | FFH_consumed(100,1070) | FFH_consumed(110,1070) |

OPTIMIZED OPERATING PROFILE

| | H.E. 1 | H.E. 2 | H.E. 3 | H.E. 4 | ... | H.E. 22 | H.E. 23 | H.E. 0 |
|---|---|---|---|---|---|---|---|---|
| OUTPUT | $MW_{1,1}, T_{1,1}$ | $MW_{1,2}, T_{1,2}$ | $MW_{1,3}, T_{1,3}$ | $MW_{1,4}, T_{1,4}$ | ... | $MW_{1,22}, T_{1,22}$ | $MW_{1,23}, T_{1,23}$ | $MW_{1,0}, T_{1,0}$ |

DAY 1

| | H.E. 1 | H.E. 2 | H.E. 3 | H.E. 4 | ... | H.E. 22 | H.E. 23 | H.E. 0 |
|---|---|---|---|---|---|---|---|---|
| OUTPUT | $MW_{2,1}, T_{2,1}$ | $MW_{2,2}, T_{2,2}$ | $MW_{2,3}, T_{2,3}$ | $MW_{2,4}, T_{2,4}$ | ... | $MW_{2,22}, T_{2,22}$ | $MW_{2,23}, T_{2,23}$ | $MW_{2,0}, T_{2,0}$ |

DAY 2

| | H.E. 1 | H.E. 2 | H.E. 3 | H.E. 4 | ... | H.E. 22 | H.E. 23 | H.E. 0 |
|---|---|---|---|---|---|---|---|---|
| OUTPUT | $MW_{3,1}, T_{3,1}$ | $MW_{3,2}, T_{3,2}$ | $MW_{3,3}, T_{3,3}$ | $MW_{3,4}, T_{3,4}$ | ... | $MW_{3,22}, T_{3,22}$ | $MW_{3,23}, T_{3,23}$ | $MW_{3,0}, T_{3,0}$ |

DAY 3

...

| | H.E. 1 | H.E. 2 | H.E. 3 | H.E. 4 | ... | H.E. 22 | H.E. 23 | H.E. 0 |
|---|---|---|---|---|---|---|---|---|
| OUTPUT | $MW_{N,1}, T_{N,1}$ | $MW_{N,2}, T_{N,2}$ | $MW_{N,3}, T_{N,3}$ | $MW_{N,4}, T_{N,4}$ | ... | $MW_{N,22}, T_{N,22}$ | $MW_{N,23}, T_{N,23}$ | $MW_{N,0}, T_{N,0}$ |

DAY N

FIG. 11

GAS TURBINE DISPATCH OPTIMIZER REAL-TIME COMMAND AND OPERATIONS

TECHNICAL FIELD

The subject matter disclosed herein relates generally to power plant operation, and, more particularly, to long-term, day ahead, and real-time operation planning of power-generating plant assets.

BACKGROUND

Many power plants employ gas turbines as a source of power to satisfy at least part of consumers' overall electrical demand. To ensure healthy long-term operation, plant facility owners typically schedule maintenance or service for their plant assets at regular intervals. Maintenance intervals for gas turbines are often defined in terms of factored fired hours, whereby maintenance is schedule for a set of gas turbines after the turbines have run for a defined number of factored fired hours (e.g., 32,000 factored fired hours) since the previous maintenance activity. The maintenance interval is typically defined based on an expected parts-life consumption for the gas turbine.

Plant operators sometimes peak-fire their gas turbines above their base capacity during peak demand periods. Peak-firing gas turbines above their base capacity produces extra power output when needed, but at the expense of faster parts-life consumption. If gas turbines are peak-fired often within the maintenance interval (or maintenance life), the incremental parts-life consumption may cause the maintenance interval to be shortened. As a result, maintenance schedules are pulled in and extra customer service agreement charges may be incurred. Consideration of these extra maintenance costs, in terms of more frequent servicing of the gas turbines, can lead plant asset owners to exercise peak-fire mode more conservatively than necessary, which may result in missed revenue opportunity.

The above-described deficiencies of gas turbine operations are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a method, comprising receiving, by a system comprising at least one processor, operating profile data for one or more power-generating assets defining values of one or more operating variables for respective time units of a life cycle; determining, by the system for a first subset of the respective time units of the life cycle corresponding to a first operating mode that produces parts-life credits relative to a target life, an amount of parts-life credited relative to the target life based on the operating profile data and parts-life model data for the one or more power-generating assets; determining, by the system for a second subset of the respective time units of the life cycle corresponding to a second operating mode that consumes the parts-life credits relative to the target life, an amount of parts-life consumed relative to the target life based on the operating profile data and the parts-life model data; determining, by the system, an amount of banked parts-life at a current time of the life cycle based on a net of the amount of parts-life credited and the amount of parts-life consumed; converting, by the system, the amount of banked parts-life to an amount of available power output capable of being generated by the second operating mode during the life cycle without violating the target life; and rendering, by the system, the amount of available power output on an interface display.

Also, In one or more embodiments, a system is provided, comprising a profile generation component configured to generate operating profile data for the one or more power-generating assets, wherein the operating profile data comprises values of one or more operating variables for respective time units of a maintenance interval, a parts-life metric component configured to determine, for a first subset of the respective time units of the maintenance interval corresponding to a first mode of operation that produces parts-life credits relative to a target life based on the operating profile data and parts-life model data for the one or more power-generating assets, a number of parts-life credits generated by the first mode of operation, wherein the parts-life credits represent an amount of parts-life that can be consumed by a second mode of operation that consumes the parts-life credits during the maintenance interval without violating a constraint relative to a target life; determine, for a second subset of the respective time units of the maintenance interval corresponding to the second mode of operation based on the operating profile data and the parts-life model data, a number of parts-life debits generated by the second mode of operation, wherein the parts-life debits represent an amount of parts-life to be compensated for by the first mode of operation during the maintenance interval to prevent violation of the constraint relative to the target life, determine an amount of banked parts-life at a current time of the maintenance interval based on a balance of the number of parts-life credits and the number of parts-life debits, and convert the amount of banked parts-life to an amount of banked power output available for the second mode of operation during the maintenance interval that will not violate the constraint relative to the target life; and a user interface component configured to render the amount of banked power output available for the second mode of operation on an interface display.

Also, according to one or more embodiments, a non-transitory computer-readable medium is provided having stored thereon instructions that, in response to execution, cause a safety relay device to perform operations, the operations comprising receiving operating profile data for one or more power-generating assets defining values of one or more operating variables for respective time units of a maintenance interval; determining, for a first subset of the respective time units of the maintenance interval corresponding to a first operating mode that credits parts-life relative to a target life for the one or more power-generating assets, an amount of parts-life credited relative to the target life based on the operating profile data and parts-life model data for the one or more power-generating assets; determining, for a second subset of the respective time units of the maintenance interval corresponding to a second operating mode that consumes parts-life relative to the target life for the one or more power-generating assets, an amount of parts-life consumed relative to the target life based on the operating profile data and the parts-life model data; determining an amount of banked parts-life at a current time of the maintenance interval based on a net of the amount of parts-life credited and the amount of parts-life consumed; determining an amount of available power output capable of being generated by the second operating mode during a remainder of the maintenance interval without violating the target life as a function of the amount of banked parts-life; and displaying the amount of available power output on an interface display.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 8 illustrates example tabular formats for pre-stored model data values.

FIG. 11 is an example display format for an operating profile.

DETAILED DESCRIPTION

Figure 1:
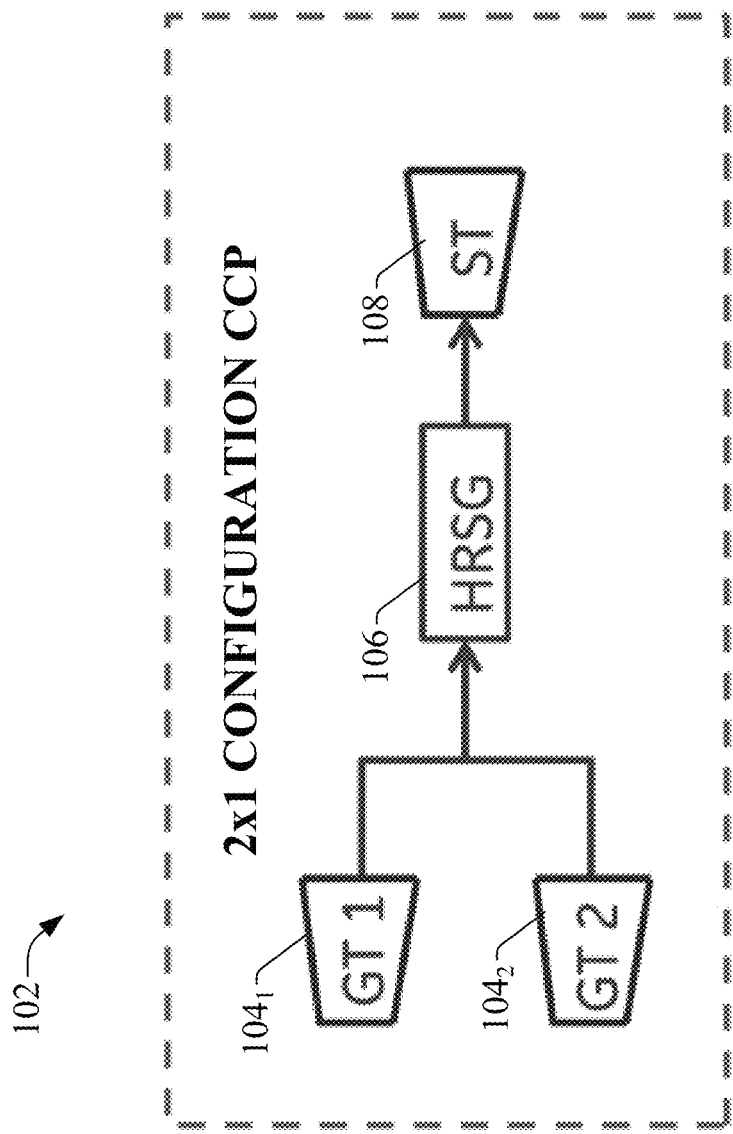
FIG. 1 is a block diagram of an example 2×1 combined cycle plant comprising two gas turbines.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Power-generating plant assets, such as gas turbines, require regular maintenance to ensure safe, reliable, and efficient operation. Many plant asset owners contract the manufacturers of such plant assets to perform scheduled maintenance on the assets. In some cases, customer service agreements (CSAs) define a usage-based maintenance scheme whereby the manufacturer guarantees an operational duration for a given asset when subject to periodic maintenance. Under such contracts, the asset owner may pay the manufacturer a fee (e.g., a usage-based fee) for maintenance of the asset, and the manufacturer performs routine inspections, provides for repairs and part replacements when necessary, and performs other service functions required to keep the plant asset functioning within the agreed upon duration (or asset life). Since the costs of such repairs and replacements, as well as the frequency of inspections, depend on the operating history of the asset, the manufacturer and owner may agree upon a system of determining the operational impact on the useful life of the asset in connection with determining when maintenance should be performed.

One way of accounting for the operational impact on the asset is by tracking a parts-life metric called factored fired hours (FFHs). According to this approach, in an example applied to a gas turbine, every hour that the gas turbine is operated (or "fired") up to its base capacity (that is, the rated capacity or base load of the gas turbine), one FFH is accrued for the gas turbine. An example gas turbine may comprise components designed to run for 32,000 FFH. If the gas turbine is operated up to its base capacity, each actual hour of operation translates to one FFH.

Gas turbines can also be operated in peak-fire mode, whereby the firing temperature (or operating temperature) is raised above the design value in order to produce a higher megawatt (MW) output relative to base-load operation. However, peak-firing also accelerates parts-life consumption. To reflect the faster consumption of parts-life during peak-firing, the number of FFH per hour of actual peak-fire operation becomes greater than one (e.g., 1 hour of peak-fire operation=2.2 FFH). This simplified FFH model is only intended to be exemplary; in some cases the actual functional relationship between gas turbine operation and FHH consumed may be based on a detailed assessment of physics, risk analysis, or other factors.

According to this FFH approach, a gas turbine that only operates up to its base load will consume its 32,000 FFH parts-life (or maintenance interval) in 32,000 actual hours of operation, whereas a gas turbine that operates in peak-fire mode for at least some of its maintenance interval will consume its parts-life in fewer than 32,000 hours of actual operation, resulting in a shortened maintenance interval.

Some model-based controls allow plant operators to compensate for incremental parts-life consumption resulting from peak-firing periods by cold part-loading (CPL) the gas turbines during other periods. Running gas turbines in CPL mode is less fuel efficient than default operation, but can beneficially extend asset parts-life (in terms of factored fired hours or another parts-life metric), thereby at least partially compensating for the extra parts-life consumed during peak-firing periods. Thus, there is a tradeoff between fuel efficiency and parts-life.

Figure 2:
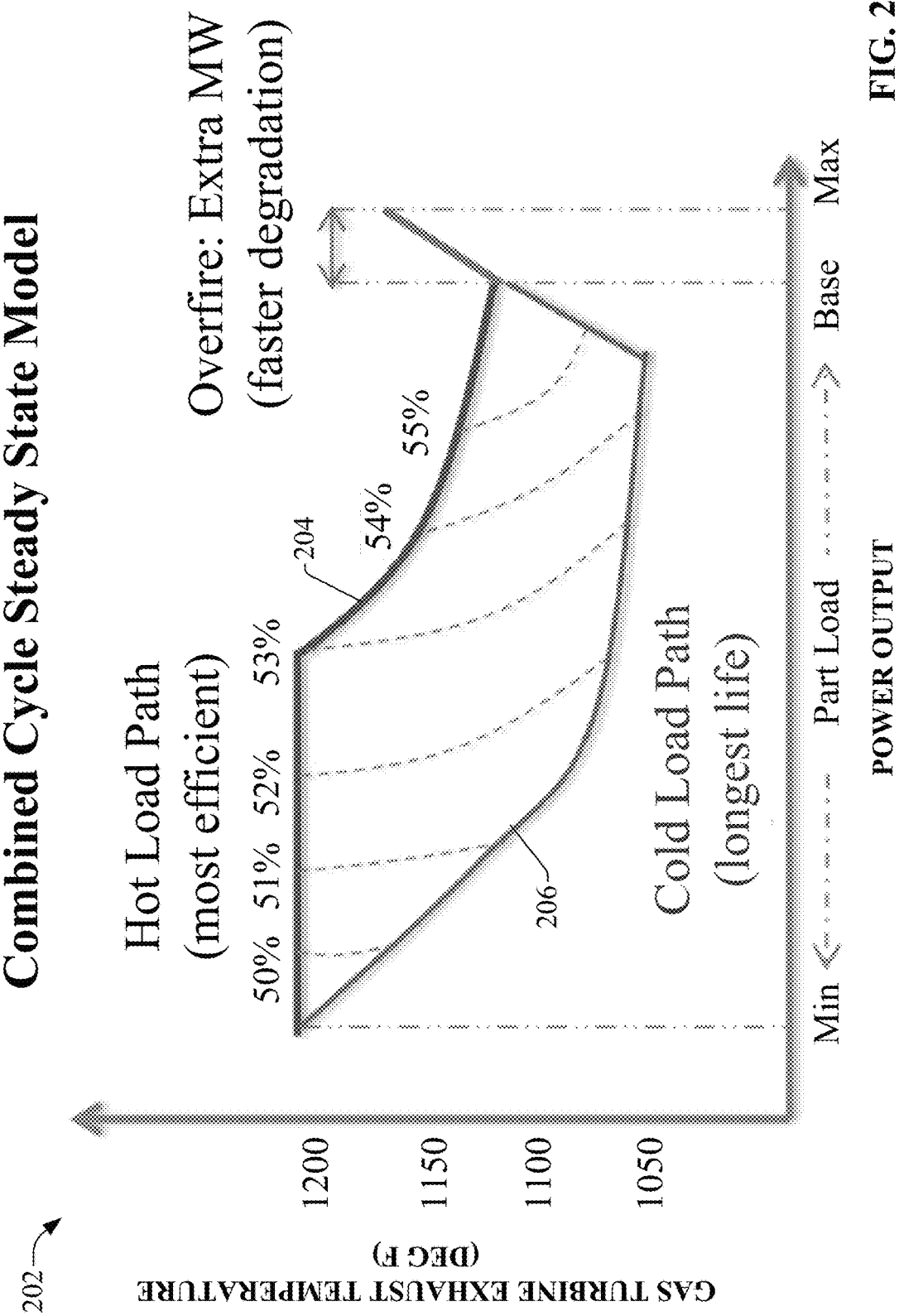
FIG. 2 is an example graph of a steady state efficiency model for the combined cycle plant.

FIG. 1 is a block diagram of an example 2×1 combined cycle plant 102, comprising two gas turbines $104_1$ and $104_2$, a heat recovery steam generator 106, and a steam turbine 108. FIG. 2 is an example graph 202 of a steady state efficiency model for the combined cycle plant 102. Graph 202 plots the gas turbine operating temperature (represented by the exhaust temperature in this example) as a function of the plant's power output for both hot load operation (line 204) and cold part-load operation (line 206). Between the minimum plant power output and base capacity (non-peak-fire operation), hot load operation—whereby the gas turbines generate power at a higher temperature, as represented by line 204—results in highest fuel efficiency in combined cycle operations, and is therefore the preferred operating mode for base operation in this scenario. If power output stays below the plant's base capacity of the plant 102 and the gas turbines are operated in hot load mode, the FFH that define the maintenance interval (or life cycle) for the gas turbines are equal to the actual operating hours.

During peak-firing (or over-firing), whereby the plant 102 generates power above the base capacity (up to the plant's maximum capacity), additional megawatts are generated, but at the cost of faster part degradation (parts-life consumption). Some systems adjust the maintenance interval for the plant assets to account for this accelerated parts-life consumption by adjusting the actual number of accumulated operating hours for the assets to yield the FFH metric, which is used to determine when maintenance should next be performed on the assets (e.g., when the factored fired hours reaches 32,000 hours). Since peak-firing consumes parts-life at an accelerated rate, FFH are consumed faster during peak-firing relative to hot load operation below the base capacity. If these consumed FFH are not compensated for within the maintenance interval, the total maintenance interval (or operating horizon) will be shortened, necessitating more frequent maintenance and uncertainty in planned outage dates.

Figure 3:
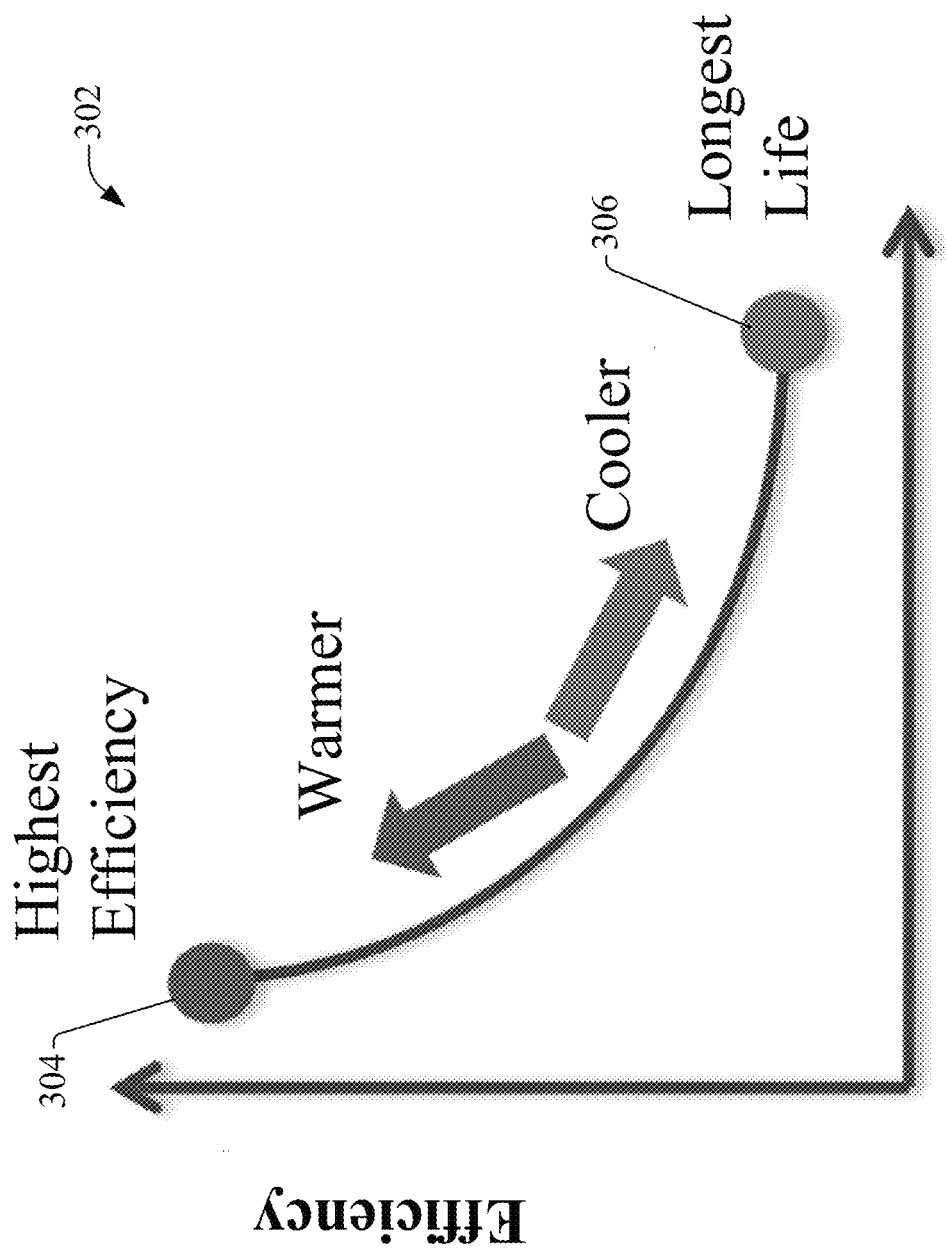
FIG. 3 is a generalized graph illustrating this tradeoff between asset life and fuel efficiency.

To compensate for FFH consumed during peak firing periods, the plant 102 can be operated in cold part-load (CPL) mode (represented by line 206) during selected non-peak periods. During CPL operation, the gas turbines are operated at lower temperatures relative to hot loading. While CPL operation is less fuel efficient than hot loading, running gas turbines in CPL mode can slow part degradation and extend the maintenance life of the turbines. FIG. 3 is a generalized graph 302 illustrating this tradeoff between asset life and fuel efficiency. Point 304 of graph 302 represents hot load operation (non-peak) and point 306 represents CPL operation. As demonstrated by this graph, higher operating temperatures yield more efficient operation with a shorter parts-life (and a correspondingly shorter maintenance interval), while cooler operating temperatures can extend parts-life at the expense of fuel efficiency.

Thus, whereas peak-firing "consumes" factored fired hours at a faster rate relative to normal hot load operation, CPL operation can "make" factored fired hours, thereby compensating for the extra FFH consumed during peak firing (though at the expense of fuel efficiency). In general, CPL operation creates FFH credits, while peak firing consumes or exhausts these FFH credits (although examples described herein assume that the maintenance interval is defined in terms of FFH, it is to be understood that the maintenance interval may be defined in terms of a different parts-life metric in some systems).

Different costs can be attributed to these operational tradeoffs. The lower fuel efficiency associated with running the gas turbines excessively in CPL mode can increase fuel costs, whereas excessive peak-firing can increase maintenance costs (e.g., customer service maintenance costs) by shortening the maintenance intervals and necessitating more frequent servicing of plant assets. The flexibility inherent in plant asset operation offers plant operators a range of operating choices at any given moment, ranging from most fuel efficient (default operation) to operation that minimizes parts-life consumption (CPL operation). Embodiments of the systems and methods described herein exploit this flexibility to "save" parts-life during CPL operating periods, and to "consume" the saved parts-life during peak-fire operations to produce extra power (MWs) over base capacity at other times (thereby compensating for the detrimental effects of peak-fire consumption).

Ideally, profits associated with power production could be substantially maximized if an optimal balance between under-firing and over-firing of the gas turbines across the maintenance interval can be identified. However, finding this substantially optimized balance is rendered difficult due in part to the large number of variable factors to be considered, including hourly fuel costs, electricity costs, and expected electrical demand or load, all of which vary as a function of time across the maintenance interval. The detrimental effects of uncertainty and reduction in operating hours (e.g., uncertainty associated with maintenance planning) can discourage owners from peak-firing their assets. As a result, power-generating plant assets are utilized below their value potential, resulting in loss of potential profit associated with missed opportunities for peak-firing.

To address these and other issues, one or more embodiments of the present disclosure provide systems and methods that substantially maximize the untapped value generated by CPL-compensated peak-firing by optimally balancing the most favorable peak-fire opportunities with the most favorable CPL opportunities. To this end, a dispatch optimization system can leverage forecast information and asset performance model data to determine how much parts-life credit (e.g., FFH credit) to accrue, the best times or conditions to accrue the parts-life credit, and the best times or conditions to consume the accrued parts-life credit by peak-firing and producing revenue. In some embodiments, the dispatch optimization system generates an operating profile for one or more gas turbines (or other power-generating assets) that balances the creation and consumption of parts-life credits across the scheduled maintenance interval so that the maintenance interval will not be shortened and additional maintenance costs (e.g., extra customer service agreement charges) will not be accrued. The dispatch optimization system also determines optimal times for creating parts-life credits (by cold part-loading) and consuming the parts-life credits (by peak-firing) that substantially maximize profit given projected energy prices, fuel costs, and demand.

The dispatch optimization system also generates and presents information that can assist plant operators or managers in making long-term, day-ahead, and same-day asset operating decisions. For example, in some embodiments the dispatch optimization system can convey the value and quality of parts-life used given current or forecasted ambient and market conditions. In an example scenario, the dispatch optimization system can determine a long-term price of life value based on forecasted conditions as well as asset performance and parts-life models, and convert this long-term optimal price of life to actionable recommendations regarding operating temperature suppression (as a function of the current operation and ambient conditions).

In various embodiments, long-term and real-time operating profiles generated by the optimization system can be leveraged in either automatic or manual asset control strategies. For example, operating profiles generated by the system can be exported to a plant asset control system, which can automatically regulate operation of the plant assets in accordance with the profiles. Alternatively, the operating profile information can be rendered in a graphical or text-based format that can be used as a guideline for operating the gas turbines over the maintenance interval.

Although examples described herein relate to the use of cold part-load operation as a means of banking or crediting parts-life and peak-fire operation as a means of consuming CPL-compensated parts-life, it is to be appreciated that some embodiments of the systems and methods described herein can perform the analyses with respect to other operating modes that bank and consume parts-life. For example, rather than or in addition to determining profitable trade-offs between CPL operation and peak-fire operation, some embodiments can be configured to determine profitable trade-offs between high and low amounts of cooling flow in a gas turbine, or between high and low steam inlet temperatures in a steam turbine. In general, embodiments described herein can be configured to determine optimized trade-offs between a "harsher" operation of plant assets and a "gentler" operation of the assets over a time horizon given parts-life constraints.

As illustrated in FIG. 2, the physics of combined cycle operations of gas turbines (or certain other power-producing plant assets) offer a certain operating flexibility. In particular, the same combined cycle megawatt output can be generated by either running the gas turbine hotter (which is more fuel efficient and has a nominal impact on life) or running the gas turbine cooler (which is less fuel efficient but has a lower impact on life). This flexibility is available below the base load (also called part-load). In general, the dispatch optimization system described herein assists owners of power-generating plant assets (e.g., gas turbines or other power producing assets) to exploit this flexibility of asset operation in order to offset, manage, and control impact on the operation horizon (or maintenance interval) while allowing for peak-firing, thereby unlocking latent asset value. By varying the extent of cold part-load (CPL) operation, varying levels of parts-life credits can be accumulated. These accumulated parts-life credits can then be used to offset the increased parts-life consumed during peak-firing periods. The dispatch optimization system described herein determines most favorable conditions for CPL operation, as well as degrees of CPL operation, in order to maximize asset utilization while keeping the operating horizon at a specified duration.

The system can begin by generating a long-term operating profile for the plant assets based on predicted ambient and market conditions. During real-time operation of the asset during the maintenance interval, the system can update the operating profile based on actual ambient and market conditions as well as the actual operating history of the assets within the maintenance interval thus far.

Figure 4:
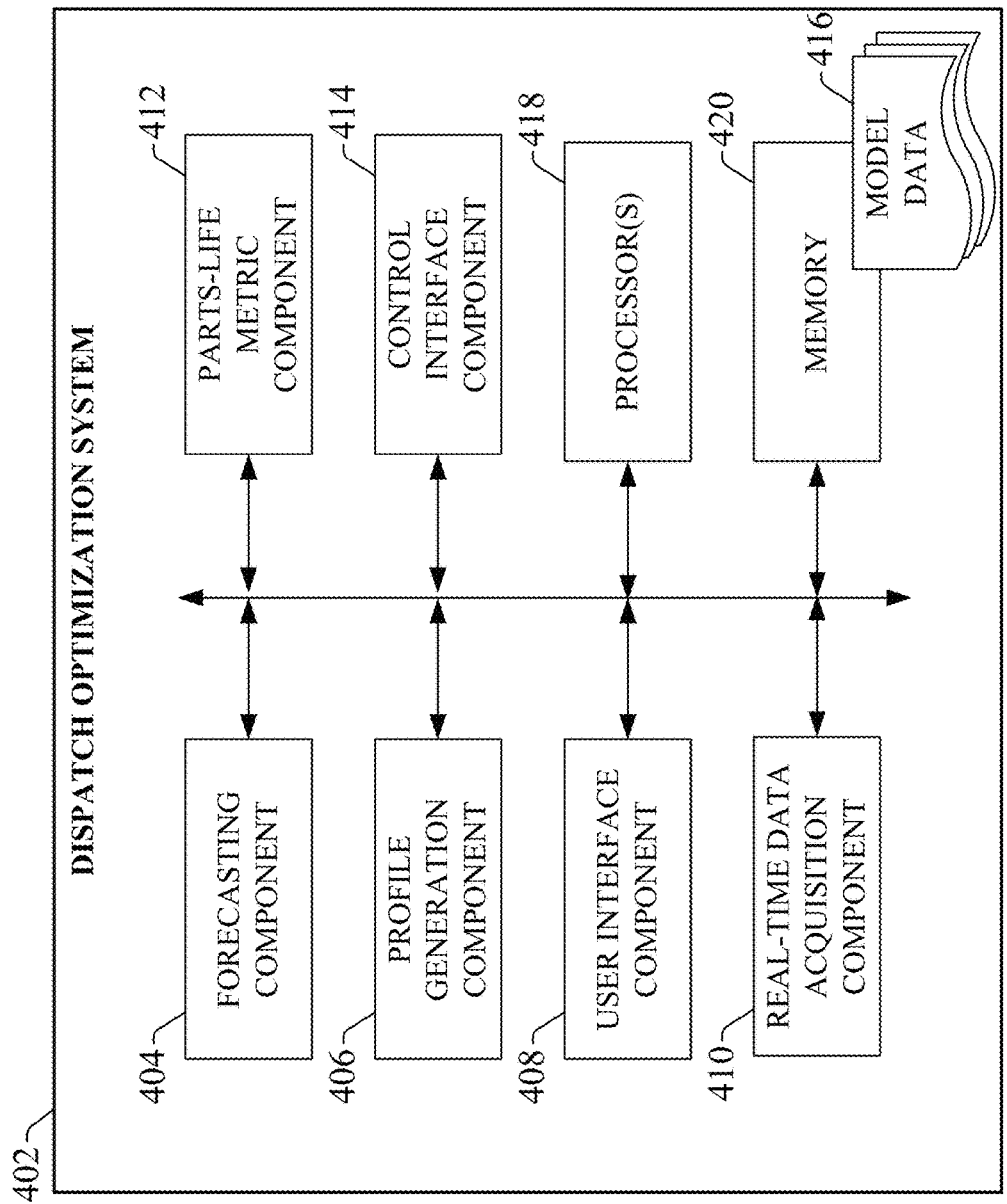
FIG. 4 is a block diagram of an example dispatch optimization system for gas turbines or other plant assets.

FIG. 4 is a block diagram of an example dispatch optimization system for gas turbines (or other plant assets) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Dispatch optimization system 402 can include a forecasting component 404, a profile generation component 406, a user interface component 408, a real-time data acquisition component 410, a parts-life metric component 412, a control interface component 414, one or more processors 418, and memory 420. In various embodiments, one or more of the forecasting component 404, profile generation component 406, user interface component 408, real-time data acquisition component 410, parts-life metric component 412, control interface component 414, the one or more processors 418, and memory 420 can be electrically and/or communicatively coupled to one another to perform one or more of the functions of the dispatch optimization system 402. In some embodiments, one or more of components 404, 406, 408, 410, 412, and 414 can comprise software instructions stored on memory 420 and executed by processor(s) 418. Dispatch optimization system 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Forecasting component 404 can be configured to receive and/or generate forecast data to be used as one or more parameters for generating a substantially optimized operating profile or schedule for a power-generating plant asset (e.g., one or more gas turbines or other such assets). The forecast data can represent predicted conditions across the duration of a maintenance interval for which the operating profile is being generated. These predicted conditions can include, but are not limited to, electrical demand or load, ambient conditions (e.g., temperature, pressure, humidity, etc.), electricity prices, and/or gas prices. In some embodiments, the forecast data can be formatted as hourly data. However, other time units for the hourly data are also within the scope of one or more embodiments. In general, the time base for the forecast data will match the time base for the operating profile. Moreover, in addition to or as an alternative to time-series data, some embodiments can be configured to consider market conditions and ambient conditions in statistical representations—such as histograms or probability distributions—rather than as time-series data.

Profile generation component 406 can be configured to determine a suitable plant asset operating profile for the maintenance interval, given the forecast data, that substantially maximizes profits and maintains the specified parts-life target life for the plant assets. The profile generation component 406 generates the operating profile based on the forecast data, performance models for the one or more plant assets being assessed, and a calculated "price of life" value representing a monetary value of parts-life credited or consumed. In the case of systems that measure parts-life in terms of factored fired hours, the price of life will have a unit of $/FFH. As will be discussed in more detail below, this price of life estimate can reduce the computational burden associated with determining the optimized operating profile. In some embodiments, the operating profile can be generated as an hourly operating schedule defining one or both of a power output and an operating temperature for the power-generating plant assets for each hour of the maintenance interval (although the examples described herein assume an hourly time base, other time bases for the operating profile are also within the scope of one or more embodiments). The profile generation component 406 can also output the price of life estimate determined for the maintenance interval.

The user interface component 408 can be configured to receive user input and to render output to the user in any suitable format (e.g., visual, audio, tactile, etc.). In some embodiments, user interface component 408 can be configured to generate a graphical user interface that can be rendered on a client device that communicatively interfaces with the dispatch optimization system 402, or on a native display component of the system 402 (e.g., a display monitor or screen). Input data can include, for example, user-defined constraints to be taken into account when generating an operating profile (e.g., upper and lower limits on gas turbine operating temperature or power output, definition of a desired operating horizon, identification of days during which the gas turbines are not allowed to run, etc.), updated ambient or market forecast data, plant shutdown date information, asset maintenance date information, or other such information. Output data can include, for example, a text-based or graphical rendering of a plant asset operating profile or schedule; current price of life estimates representing a cost of saving additional parts-life given current and predicted conditions; recommended hours of cold part-load and peak-fire operating, estimates of parts-life remaining based on a net of CPL and peak-fire operations; estimates of the lowest electricity price, given forecasted conditions and historical operation, that would justify peak-fire operation from a profit standpoint, a number of banked megawatt-hours (MWh) that can be generated by peak-fire operation without violating a target life constraint; comparative metric graphs; or other such outputs.

The real-time data acquisition component 410 can be configured to receive or acquire current or historical values for the ambient, market, and asset operating conditions represented by the forecast data. As will be described in more detail herein, the optimization system 402 can use these real-time or historical values to update the recommended operating profile for the plant assets during the maintenance interval or operating horizon, as well as to update parts-life and monetary metrics presented to the user to guide profitable and balanced operation of the plant assets.

The parts-life metric component 412 can be configured to generate various metrics relating to parts-life consumed or saved by the plant asset during operation within a maintenance interval, estimated cost of parts-life saved by CPL operation, banked MWh available for peak-fire operation as a result of CPL operation, minimum electricity prices at which banked MWh can be advantageously generated via peak-fire operation, or other such metrics. The control interface component 414 can be configured to interface and exchange data with a plant asset control system. This can include, for example, exporting operating profile information (e.g., hourly power output schedule, hourly operating temperatures, etc.) to the control system, and receiving actual real-time and/or historical operating information from the control system for use in updating planning metrics and operating profiles.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Although features of the dispatch optimization system 402 are described herein with reference to gas turbines, it is to be appreciated that embodiments of the dispatch optimization system 402 are not limited to use with gas turbines, but rather can generate operating profiles or schedules for other types of power-generating assets.

Figure 5:
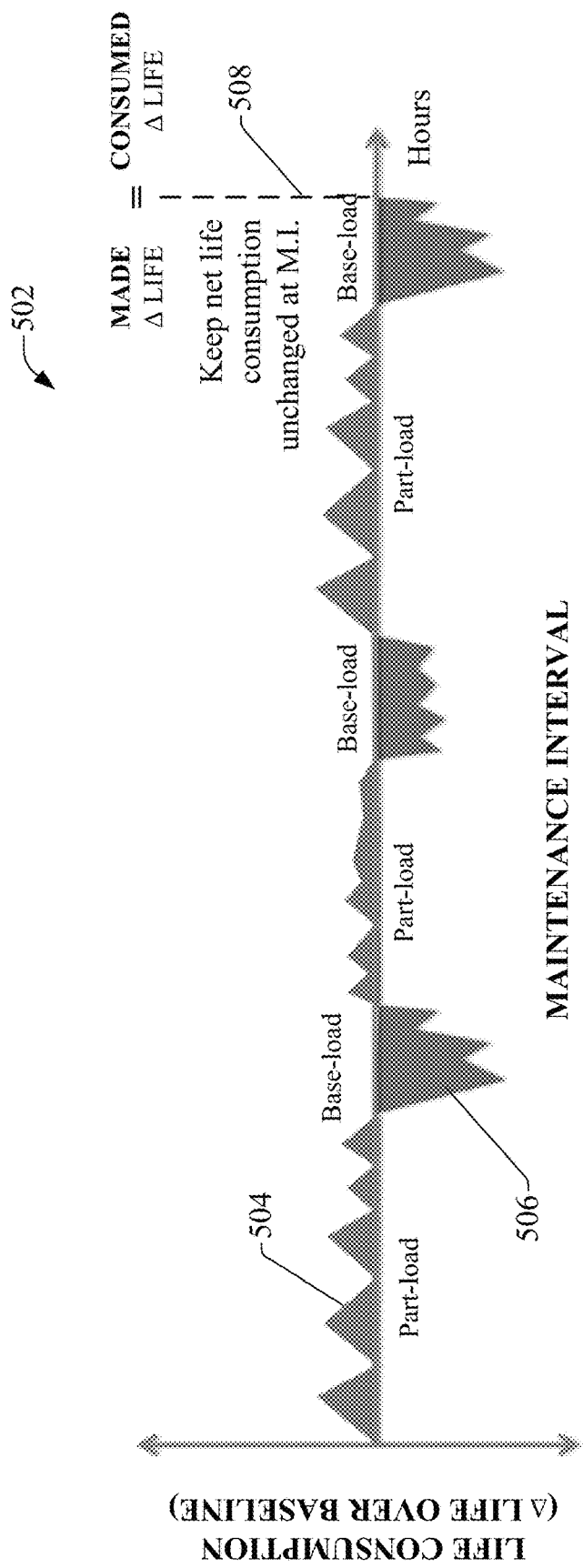
FIG. 5 is a graph plotting the change in parts-life for a gas turbine or a set of gas turbines as a function of time over a total maintenance interval for an example operating scenario.

To illustrate the concept of banking and consuming parts-life during a operation of a plant asset across a maintenance interval, FIG. 5 is a graph 502 plotting the change in parts-life for a gas turbine or a set of gas turbines as a function of time over a total maintenance interval for an example operating scenario. The vertical dashed line 508 represents the target life for the plant asset, or the time at which the next maintenance service will be scheduled if no peak-firing or CPL operation is performed during the maintenance interval. This target life may be defined in terms of a number of factored fired hours (e.g., 32,000 factored fired hours), or another parts-life metric. If the gas turbines are only operated to output power up to the base capacity in hot load mode throughout the maintenance interval (referred to as baseline operation), the target life will be reached when the number of actual operating hours (or fired hours) reaches the scheduled number of factored fired hours defining the target life.

As noted above, when the plant assets are peak-fired, the number of remaining factored fired hours is adjusted downward relative to baseline operation to reflect faster parts-life consumption. The negative curves 506 of graph 502 represent peak-fire periods, which cause a downward adjustment to the maintenance interval duration relative to the baseline (i.e., a negative change of life). When the gas turbines are cold part-loaded, the number of remaining FFH is adjusted upward to reflect slower parts-life consumption relative to baseline operation. The positive curves 504 of graph 502 represent CPL operation, which causes an upward adjustment to the maintenance interval duration relative to the baseline (i.e., a positive change of life).

As demonstrated by graph 502, CPL operation creates FFH credits (or, more generally, parts-life credits), while peak-firing consumes or exhausts these FFH credits. If the "consumed" FFH credits are balanced with the "made" FFH credits across the maintenance interval ("made" Δ life="consumed" Δ life), the net parts-life for the maintenance interval remains unchanged and the maintenance interval will not be shortened (that is, target life 508 will not be pulled in). Depending on such factors as the energy demand, fuel prices, and energy prices at each time unit (e.g., hour) of the maintenance interval, the overall profit from operating the plant assets over the maintenance interval is partly a function of the selected times during which the assets are peak-fired and cold part-loaded.

During a long-term forecasting and planning stage, the dispatch optimization system 402 described herein can determine a suitable operating schedule for the plant assets (e.g., gas turbines) that substantially maximizes the profit over the maintenance interval by identifying the most favorable peak-firing opportunities given load and ambient condition forecasts as well as performance model data for the plant assets, and balancing these peak-firing times by identifying most favorable opportunities for CPL operation such that the target life for the assets remains substantially unchanged.

In order to solve this optimization problem with minimal computational burden despite the long operating horizon, the dispatch optimization system 402 generates this operating profile based on an estimated price of life value $\lambda$, which represents an incremental extra amount of profit for incremental additional life. In this regard, the dispatch optimization system 402 accounts for creation (by CPL) and exhaustion (by peak fire operation) of FFH credits by means of computing the cost of such FFH credits based on an estimated price of life value $\lambda$ (in units of $/FFH). In an example scenario, it may be determined that, based on the cost of fuel for a given hour, one unit of parts-life saved by CPL operation costs $1 in additional fuel due to the reduced fuel efficiency of CPL operation. It may also be determined that one unit of parts-life lost as a result of peak-firing will produce one extra MW of power. It can therefore be assumed that it is worth saving life via CPL operation only if the electricity price will be greater than $1/MWh, indicating a suitable opportunity to consume the extra parts-life during a peak-fire operation.

In some embodiments, the price of life $\lambda$ may be a vector quantity for a given plant asset. For example, a given plant asset may comprise multiple stages, where each stage has a different target life (or maintenance interval). In such scenarios, each stage may have a different price of life value, where the set of price of life values for all stages of the asset make up a price of life vector.

If an estimated ideal price of life is known, the problem simplifies to deciding, at each time unit of the maintenance interval (or in the case of statistical data, each operating condition), the value of the plant output (typically in MW) and/or operating temperature (e.g., exhaust temperature, inlet temperature, etc.) that maximizes profit, as given generally by:

$$\text{Profit}=(\text{Electricity revenue})-(\text{Cost of Fuel Burn})-(\text{Cost of Life}) \quad (1)$$

The electricity revenue can be determined based on the product of the electricity price for the time unit and the power output (e.g., MWh) generated for the time unit. The cost of fuel burn can be determined based on the product of the fuel cost for the time unit and the amount of fuel consumed during the time unit (which can be determined based on performance model data for the plant asset that models the asset's fuel consumption as a function of one or both of power output and/or operating temperature). The cost of life can be determined based on the product of the estimated price of life $\lambda$ and the number of FFH consumed (which can be determined based on parts-life model data for the plant asset that models the consumed FFH as a function of one or both of power output and/or operating temperature).

As will be described in more detail below, the dispatch optimization system 402 uses an iterative analysis technique to determine, for each time unit (e.g., hour) of the maintenance interval, a recommended output (MW) and/or operating temperature (T) for the plant asset that a maximum profit for the maintenance interval while satisfying the target life constraint (that is, without significantly altering the duration of the maintenance interval). This iterative technique comprises an inner loop iteration and an outer loop iteration. The inner loop determines an operating profile that maximizes the profit for each time unit of the maintenance interval according to equation (1) given an estimated price of life value λ. The outer loop then determines whether the target parts-life resulting from the operating profile is substantially equal to the actual target parts-life for the plant asset (within a defined tolerance). If this target parts-life constraint is not satisfied, the estimated price of life value λ is adjusted in the appropriate direction, and the inner loop is re-executed using the adjusted price of life value. These iterations are repeated until a profit maximizing operating profile is found that satisfies the target parts-life constraint for the asset (that is, an operating profile that results in a maintenance interval that is substantially equal to the target maintenance interval with a defined tolerance).

Figure 6:
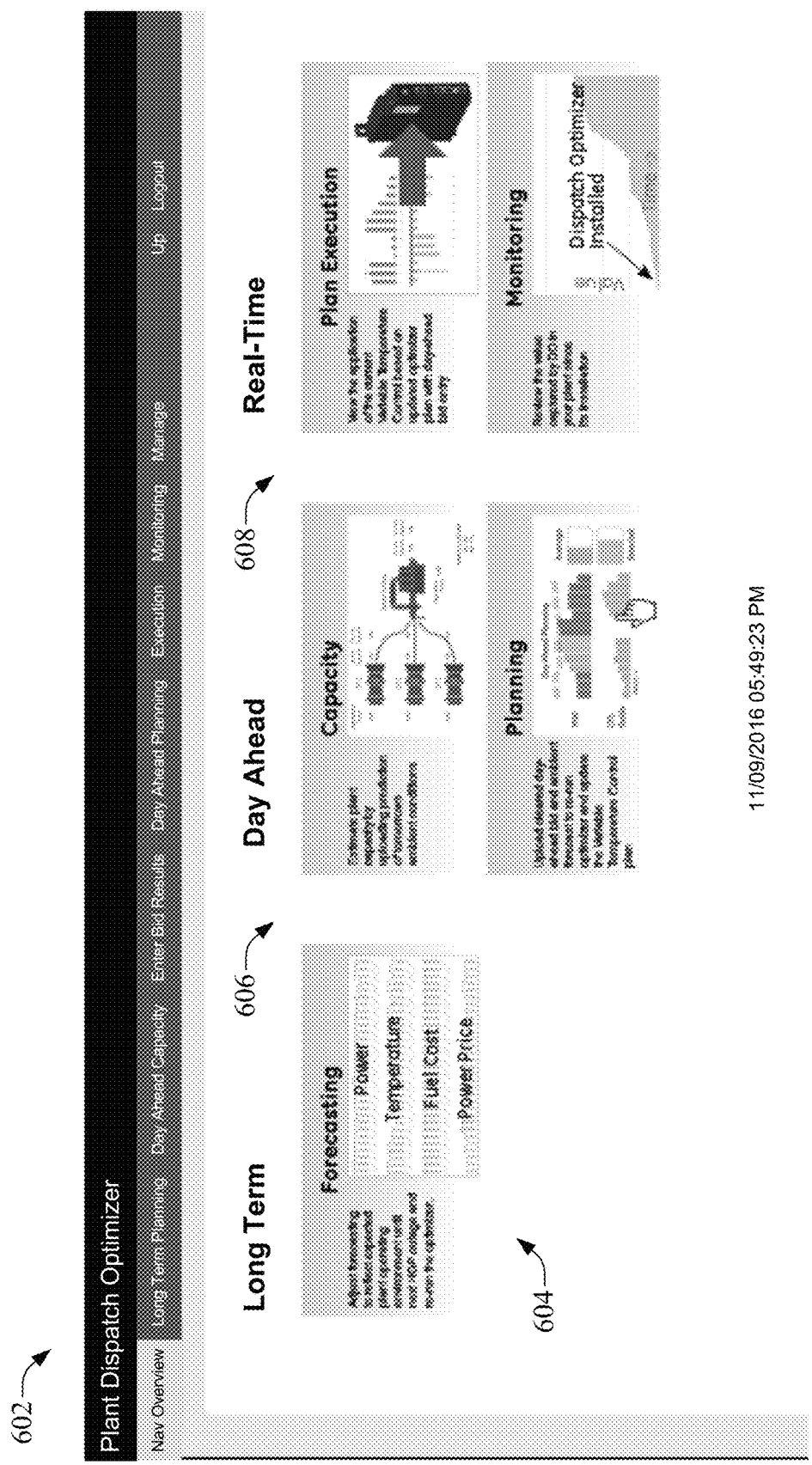
FIG. 6 is an example overview display for the dispatch optimization system.

FIG. 6 is an example overview display 602 for the dispatch optimization system 402, which can be generated by user interface component 408. The overview display 602 can include selectable graphics for navigating to other displays of the system 402, categorized according to long-term planning 604, day-ahead planning 606, and real-time planning and operations 608. The long-term planning sequence, during which an optimized operating profile for a future maintenance interval is generated, can be initiated and viewed via interactions with long term displays accessible via the long-term graphic 604.

Figure 7:
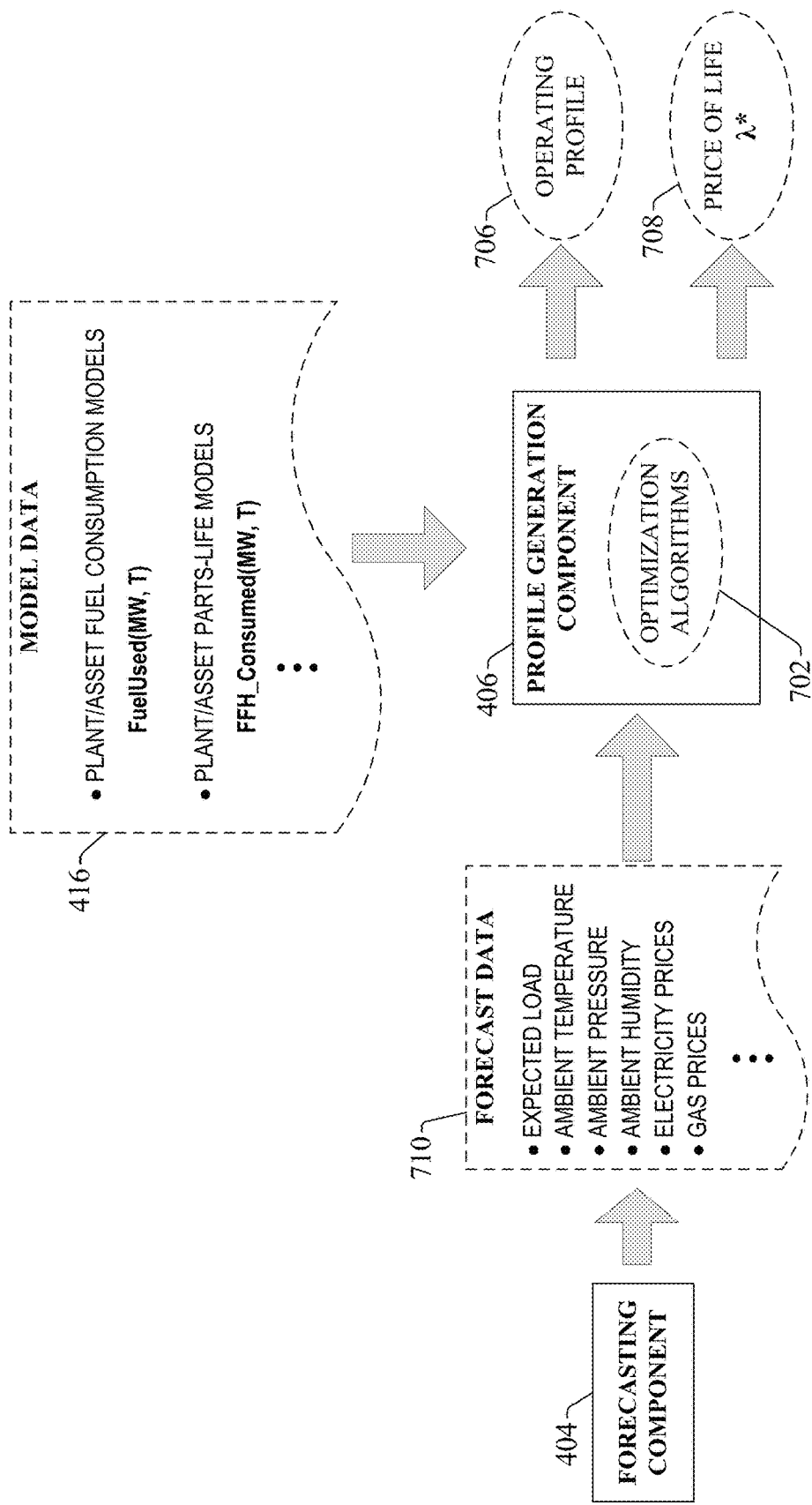
FIG. 7 is a block diagram illustrating example data inputs and outputs for a profile generation component of the dispatch optimization system during the long-term planning operations.

FIG. 7 is a block diagram illustrating example data inputs and outputs for the profile generation component 406 of the dispatch optimization system 402 during the long-term planning stage. As will be described in more detail herein, similar inputs and outputs are used during subsequent day-ahead and real-time planning and operation, but with actual and/or historical ambient, market, and operational data replacing at least some of the forecast data.

In the examples described herein, the plant assets are assumed to be a set of gas turbines. However, it is to be appreciated that the optimization techniques carried out by embodiments of the dispatch optimization system 402 are also applicable to other types of power-generating plant assets. Moreover, although the examples described herein assume an operating profile having an hourly time base, other time bases are also within the scope of one or more embodiments. Also, while the parts-life metric in the following examples is assumed to be FFH, some embodiments of the dispatch optimization system 402 can be configured to determine operating profiles based on other parts-life metrics.

Profile generation component 406 is configured to execute one or more optimization algorithms 702 that perform the inner loop and outer loop iterations described above. In order to accurately calculate the cost of fuel burn and the cost of consumed FFH (or another parts-life metric) by the gas turbines, the dispatch optimization system 402 is provided with model data 416, including one or more fuel consumption models and one or more parts-life models for the gas turbines. These models can be customized to the particular gas turbines under investigation based on engineering specifications, historical operation data, or other such information.

An example fuel consumption model may define an estimated amount of fuel consumed by the gas turbines for a given time unit (e.g., an hour) as a function of the power output MW and the operating temperature T (which may be an exhaust temperature, an inlet temperature, or another temperature indicative of the overall operating temperature), and/or ambient conditions AMB such as ambient temperature, pressure, humidity, etc. Such performance models may be stored on memory 420 associated with the dispatch optimization system 402, either as a mathematical function (e.g., FuelUsed(MW, T, Amb)) describing the relationship between fuel consumption and combinations of MW and T for a given Amb, or as a table of precomputed values that can be accessed by the profile generation component 406 as needed in order to obtain fuel consumption estimations for different operating scenarios.

An example parts-life model may define an estimated number of factored fired hours (or other parts-life metric) consumed for a given time unit as a function of power output MW and operating temperature T, and/or ambient conditions Amb such as ambient temperature, pressure, humidity, etc. Similar to the fuel consumption model, the parts-life model can be stored on memory 420, either as a mathematical function (e.g., FHH_Consumed(MW, T, Amb)) describing the relationship between FFH consumed and combinations of MW and T for a given Amb, or as a table of precomputed values that can be accessed by the profile generation component 406 as needed in order to obtain FFH consumption estimations for different operating scenarios.

FIG. 8 illustrates example tabular formats for pre-stored model data values for a given Amb. Table 802 is an example data table corresponding to a performance model (e.g., FuelUsed(MW, T)), and table 804 is an example data table corresponding to a parts-life model (e.g., FFH_consumed (MW, T)). Performance model data table 802 is a two-dimensional grid of fuel consumption values 808 for respective combinations of power output MW (columns 812) and operating temperature T (rows 814). For embodiments in which the model data is stored as pre-computed values, the performance model data values can be stored in memory 420 in a format similar to that shown in table 802 (or another suitable format), whereby precomputed data values 808 representing the amount of fuel consumed for a given combination of power output (MW) and operating temperature (T) are stored for a range of [MW, T] pairs (e.g., as comma-delimited data or any other suitable storage format). During an iteration of the optimization process to be described in more detail below, the profile generation component 406 can access table 702 and retrieve the pre-stored value of FuelUsed(MW, T) corresponding to the power output and operating temperature value pair that most closely match the pair of test values under consideration for the current iteration of a given hour. Pre-storing these precomputed values can reduce the computational burden of the optimization process relative to storing the model data as mathematical functions that must be executed with each iteration in order to compute the amount of fuel consumed for a given [MW, T] pair.

The parts-life model data table 804 can be stored in a similar format. In particular, the parts-life model data table comprises a grid of values 810 representing the number of FFH consumed during a time unit (e.g., an hour) in which the one or more gas turbines output an amount of power MW at an operating temperature of T for a range of values of MW and T. During operation, the profile generation component 406 can access table 704 to retrieve the number of FFH consumed for a given [MW, T] pair being considered in a current iteration of the optimization sequence.

The data values 808 and 810 can be stored at any suitable degree of granularity of MW and T values. The degree of granularity may depend, for example, on the constraints of the computational environment on which the dispatch optimization system runs, whereby environments with sufficiently large data storage capacity can store the data values 808 and 810 at a higher degree of granularity (resulting in a larger number of pre-computed values). In the example tables 802 and 804 depicted in FIG. 8, the data values 808 and 810 are stored at a granularity of 10 MW and 10° F. However, other suitable granularities are also within the scope of one or more embodiments. If the values of MW and T being considered by the profile generation component 406 fall between the available values of MW and/or T represented in tables 802 and 804, the profile generation component 406 may select values of MW and T represented in tables 802 and 804 that are nearest to the values of MW and T being considered (e.g., by rounding the values under consideration to the nearest tabulated values), and select the fuel consumption and FFH values corresponding to these nearest values of MW and T. Alternatively, in some embodiments, the profile generation component 406 may be configured to interpolate between the tabulated values 808 and 810 if the actual values of MW and T being considered fall between tabulated values represented in tables 802 and 804.

While FIG. 8 depicts the fuel consumption values and FFH values as being functions solely of power output and operating temperature, some embodiments may model the fuel consumption and FFH consumption as functions of additional factors. In such embodiments, the pre-calculated data values may be stored as higher order tables depending on the number of variables used to calculated fuel consumption and FFH. Also, while deterministic models are assumed in the present example, in some embodiments stochastic models may be used to model the performance and parts-life for a given plant asset.

Figure 9:
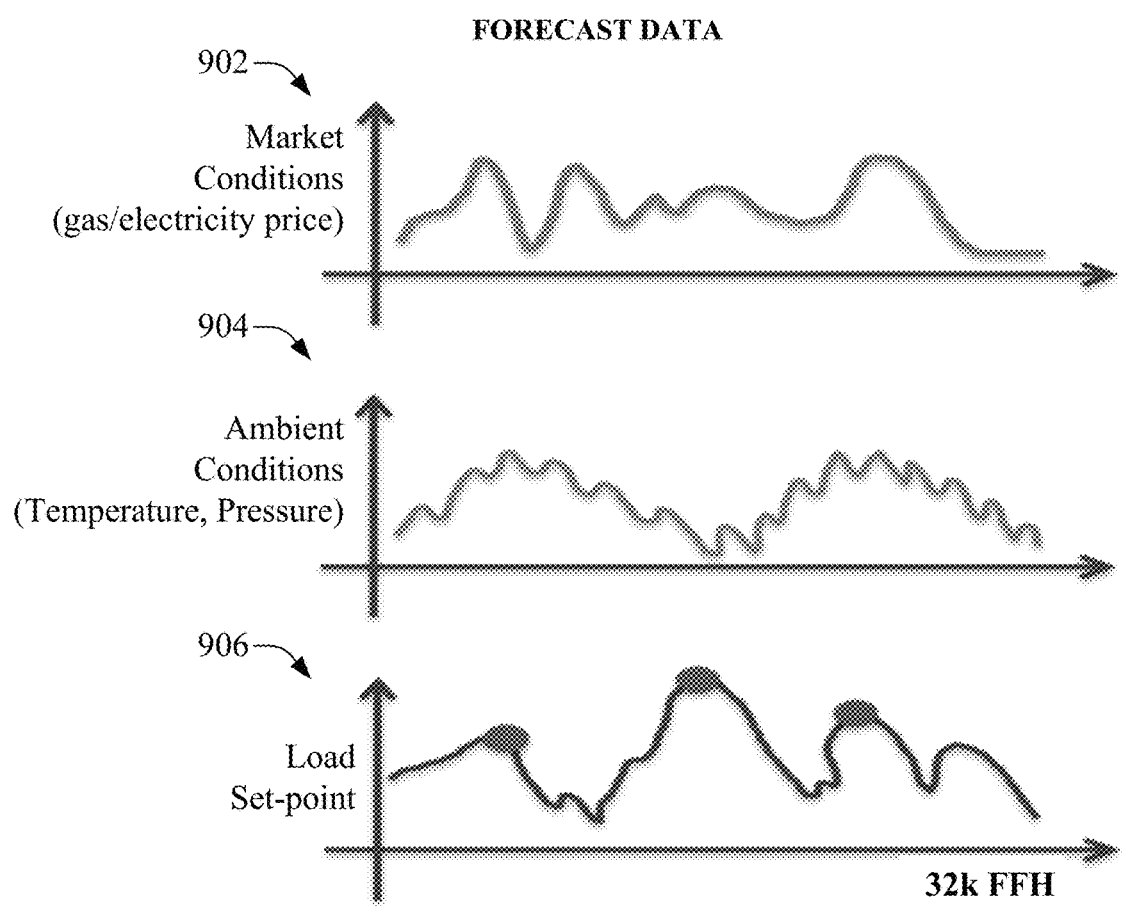
FIG. 9 depicts graphs that plot example forecast data under three categories—predicted market conditions, predicted ambient conditions, and predicted load or electrical demand.

Returning now to FIG. 7, forecast data 710 provided to the system is now described. When an operating profile for one or more gas turbines (or other plant assets) is to be generated for an operating interval (e.g., a maintenance interval), forecast data 710 is leveraged to provide a nominal prediction of operations and conditions for the operating interval being planned. Forecast data 710 can comprise time-based information (e.g., hourly data) describing expected ambient conditions and/or market factors that play a role in deciding when to peak-fire the gas turbines and when to operate the gas turbines in CPL mode, where the forecast data 710 encompasses a time range corresponding to the operating interval being planned. FIG. 9 depicts graphs that plot example forecast data under three categories—predicted market conditions (graph 902), predicted ambient conditions (graph 904), and predicted load or electrical demand (graph 906). Predicted market conditions can include for example, predicted hourly electricity prices and predicted hourly gas prices (or hourly prices for other types of fuel burned by the plant assets under investigation). Predicted ambient conditions can include, for example, predicted hourly temperature, pressure, and/or humidity. The time range for the forecast data 610 encompasses the hours that make up the maintenance interval being planned (e.g., a 32,000 FFH duration in the present example). Although the forecast data 610 is described as having an hourly time base, other time bases may be used without departing from the scope of one or more embodiments described herein. In general, the time base for the forecast data 610 will match the time base used for plant operation (e.g., hourly data for power plants that participate in day-ahead electricity markets).

Returning now to FIG. 7, in some embodiments, some or all of the forecast data 710 can be entered into the dispatch optimization system 402 by the user (e.g., via user interface component 408). Alternatively, forecasting component 404 may be configured to retrieve some or all of the forecast data 710 from external sources of forecast information, including but not limited to weather forecasting websites, electricity and/or gas market websites, or other such sources. In yet another example, forecasting component 404 can be configured to generate some or all of the forecast data 710 based on analysis of relevant data sets provided to the forecasting component 404. For example, in some embodiments, forecasting component 404 can be configured to execute load forecasting algorithms that generate an expected hourly electrical demand for the maintenance interval based on forecasted weather or ambient conditions for the maintenance interval. In such embodiments, the forecasting component 404 can be provided with such ambient condition information as an expected hourly temperature, an expected hourly pressure, and/or an expected hourly humidity, and based on this ambient condition information, generate an expected hourly electrical demand. The forecasting component 404 can execute any suitable forecasting algorithms for generating an hourly predicted electrical load based on a given set of hourly ambient data.

The profile generation component 406 combines at least a subset of the forecast data 710 with the model data 416 representing asset performance and parts-life for the gas turbines to form an optimization problem with an objective of maximizing profit subject to maintaining one or more specified parts-life targets and other operability conditions. In the present example, the variables of the problem are plant output MW and operating temperature T, which may be an exhaust temperature, an inlet temperature, or another factor indicative of the overall operating temperature. The plant output variable MW is associated with the ability to peak-fire the gas turbines to capture extra revenue, and the operating temperature T sets the level of CPL operation.

The profile generation component 406 solves the optimization problem to yield an operating profile 706 (also referred to as an operating schedule), which defines recommended hourly operating parameters—in terms of power output MW and operating temperature T in the present example—determined to maximize profit for the maintenance interval without significantly changing the target life for the asset (that is, without significantly changing the duration of the maintenance interval). The operating profile 706 identifies suitable peak-firing opportunities within the maintenance interval as well as suitable periods during which to operate in CPL mode in order to compensate for the additional FFH consumed during the peak-fire periods. In this way, the system 402 generates an operating profile 706 serves as a guide to substantially maximizing utilization of the plant asset without shortening the maintenance interval or otherwise increasing customer service agreement charges.

The profile generation component 406 also generates an estimated optimal price of life value $\lambda^*$ 708, which is derived in parallel with the operating profile 706, as will be described in more detail below. This price of life value will be used subsequently by the system 402 during real-time planning and operation to identify optimal peak-fire opportunities given real-time and historical conditions, to generate and present cost-of-life information to the user in meaningful ways intended to guide optimal asset operation, and for other purposes to be disclosed herein. The price of life value, used as a factor for determining a maximally profitable operating schedule, can also reduce the computational burden of solving the maximization problem over long operating horizons.

Figure 10:
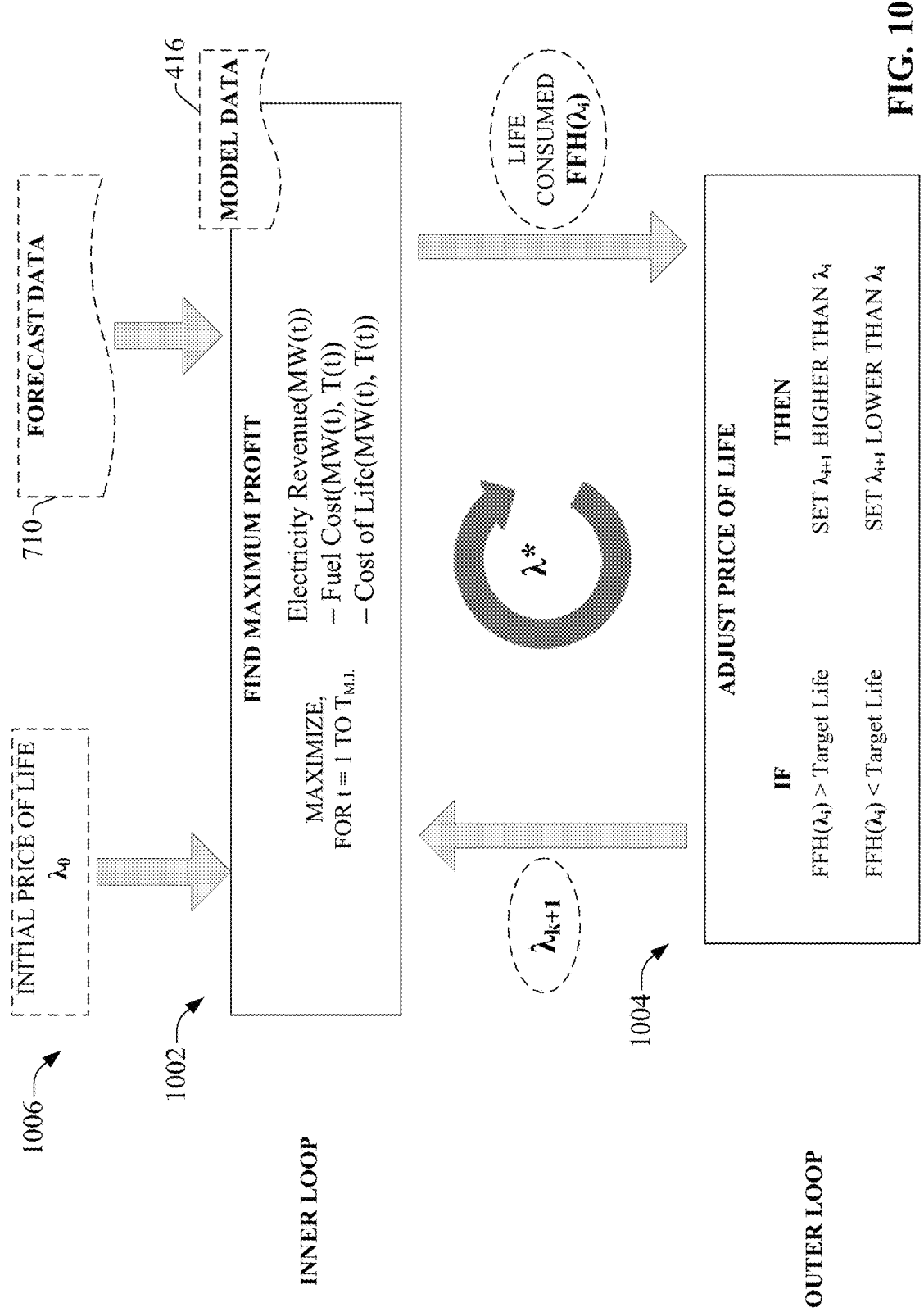
FIG. 10 is a computational block diagram illustrating an iterative analysis performed on forecast data and model data by a profile generation component to produce a substantially optimized operating profile.

FIG. 10 is a computational block diagram illustrating the iterative analysis performed on the forecast data 710 and the model data 416 by the profile generation component 406 to produce the substantially optimized operating profile 706. As will be discussed in more detail below, similar iterative analysis can be used for both the long-term planning as well as real-time planning and operation. In general, the profile generation component 406 uses a two-layer iteration approach to solve the optimization problem, whereby the iteration processing comprises an inner loop 1002 and an outer loop 1004. The problem solved by iterations of the inner and outer loops can be defined as maximizing the profit generated over the maintenance interval subject to the target parts-life constraint. In mathematical terms, this problem can be stated as:

Maximize $$\sum_{t=1}^{T_{M.I.}} \{(\text{electricity price})(MW) - (\text{fuel price})(T)\}$$

Subject to $$\sum_{t=1}^{T_{M.I.}} FFH \leq \text{target life}$$

where $T_{M.I.}$ is the duration of the maintenance interval, and the range of operating temperature T is limited by the operating temperature range of the turbines (i.e., $T_{min} \leq T \leq T_{max}$). Although the example analysis described herein assumes a parts-life metric defined in terms of FFH, it is to be appreciated that other metrics for parts-life may also be used without departing from the scope of one or more embodiments of this disclosure. Moreover, while the examples described herein assume time-based operating profiles and forecast data, some embodiments of the profile generation component 406 can also perform a statistical-based analysis that generates a condition-based operating profile rather than a time-based profile.

Performing this optimization for multiple iterations over a large maintenance interval (e.g., 32,000 hours) can result in a large optimization problem. In order to reduce the computational burden associated with solving the optimization problem, the profile generation component 406 uses the price of life metric $\lambda$ to account for creation (by CPL operation) and exhaustion (by peak-fire operation) of FFH credits by computing the cost of the FFH created or consumed, and factoring this cost into the profit calculation.

In general, the inner loop 1002 finds an hourly schedule of power output MW and operating temperature T determined to maximize or substantially maximize the profit over the maintenance duration (e.g., by maximizing equation (1)), given an estimated price of life $\lambda$. This may include identifying an hourly schedule of MW and T that balances peak-fire durations (which consumed FFH credits) with CPL durations (which creates FFH credits) in a manner determined to maximize profit for the maintenance duration as a whole.

Since the profit for a given hour depends on the electricity prices and the fuel costs for that hour, the profile generation component 406 uses the predicted market information included in forecast data 710—the electricity prices and gas prices—together with the asset performance models represented by model data 416. For example, the profit given by equation (1) above can be rewritten as $$\text{Profit} = \text{ElecPrice}(t)*MW(t) - \text{FuelPrice}(t)*\text{FuelUsed} \\ (MW(t),T(t)) - \lambda*\text{FFH\_consumed}(MW(t),T(t)) \quad (2)$$

where ElecPrice(t) is the forecasted price of electricity as a function of time, and FuelPrice(t) is the forecasted price of fuel (e.g., gas prices in the case of gas turbines) as a function of time, both of which are obtained from the hourly forecast data 710. Note that the profit given by equation (2) takes into account the cost of life (FFH) consumed, as represented by a product of the price of life $\lambda$ and the number of FFH consumed as a result of generating a power output MW at an operating temperature of T for the time unit (e.g., hour) in question.

As noted above, the values of FuelUsed(MW(t), T(t)) and FFH_consumed*(MW(t), T(t)) can be obtained for each iteration of the inner loop based on the model data 416, which includes performance model data FuelUsed(MW, T) and parts life model data FFH_consumed(MW, T). This model data can be stored as respective mathematical functions or as an array of pre-calculated values (as illustrated in FIG. 8). Storing the model data as pre-calculated values can significantly improve execution time of the iterations by reducing the inner loop optimization to essentially arithmetic operations followed by comparisons, thereby eliminating the need to evaluate mathematical functions over successive outer loop iterations.

After the forecast data 710 has been provided to the dispatch optimization system 402, the user can initiate a long-term operating profile generation sequence that generates a long-term recommended operating profile for a given maintenance interval (the maintenance interval covered by the time range of the forecast data 710). In some embodiments, the user interface component 408 can generate interface displays that allow the user to enter one or more additional constraints (e.g., via user interface component 408) prior to initiation of the profile generation sequence. These user-defined constraints can include, for example, upper and lower limits on the operating temperature or power output, modifications to the desired operating horizon (that is, modifications to the target duration of the maintenance interval), identification of days during which the gas turbines are not allowed to run (e.g., based on plant shutdown or planned gas turbine outage schedules schedules), or other such constraints. In addition, in some scenarios the forecasted load or electrical demand for each hour of the maintenance interval can be used as a constraint on the optimization problem. For example, in some embodiments the user interface component 408 can allow the user to specify that the power output for a given hour of the maintenance interval is not to exceed the forecasted load for that hour, or is not to exceed the forecasted load plus a specified tolerance adder. In addition, additional operating variables corresponding to other options available to a customer such as duct-burners, evaporative coolers, chillers, etc. can be added to the dispatch optimization system.

Initially, for the first set of iterations of the inner loop 1002, an initial price of life estimate $\lambda_0$ 1006 is used. Using this initial price of life estimate, the profile generation component 406 determines an initial hourly schedule of MW and T determined to maximize the profit given by equation (2) for each hour of the maintenance interval being planned (although the example described herein assumes an hourly time base, other time units are also within the scope of one or more embodiments). That is, the profile generation component 406 determines, for each time unit t=0 to $T_{M.I.}$ (where $T_{M.I.}$ is the number of time units in the maintenance interval; e.g., 32,000 fired hours), values of the power output MW(t) and operating temperature T(t) that maximize or substantially maximize equation (2) for each hour. During this inner loop processing, the profile generation component 406 can reference the forecast data 710 to determine the predicted electricity price ElecPrice(t) and fuel price Fuel-Price(t) for a given time unit (e.g. an hour) t. The profile generation component can also reference model data 416 to determine the expected amount of fuel consumed FuelUsed (MW(t), T(t)) and the expected amount of FFH consumed FFH_consumed(MW(t), T(t)) for a given combination of power output MW and operating temperature T. The profile generation component 406 may perform multiple iterations of the inner loop for each hour in order to converge on values of MW and T that maximum profit for that hour, given the expected electricity prices, expected fuel prices (e.g., gas prices), and estimated price of life (as well as any defined upper and lower limits on MW and T).

The hourly schedule of MW and T generated as a result of the first execution of the inner loop 1002 represents a provisional operating schedule, subject to verification that the operating schedule satisfies the target life constraint. After the inner loop processing has determined this provisional hourly operating schedule of MW and T determined to maximize profit for the maintenance interval (the first execution of inner loop 1002), the profile generation component 406 executes the outer loop 1004 to determine whether the provisional operating schedule satisfies the target life constraint. As noted above, the target life constraint can be described as $$\sum_{t=1}^{T_{M.I.}} FFH \le \text{target life}$$

In general, the profile generation component 406 seeks to determine a profit-maximizing hourly operating profile for the maintenance interval that also keeps the total number of consumed FFH at or below the target life of the maintenance interval (e.g., 32,000 fired hours). That is, the amount of extra FFH life consumed during peak-fire hours defined by the operating profile should be substantially equal (within a defined tolerance) to an amount of extra FFH life credited during CPL hours defined by the operating profile. This ensures that the maintenance interval will not be shortened and associated additional maintenance costs will not be incurred, while at the same time optimizing utilization of the plant asset's capacity over the maintenance interval given forecasted conditions.

To this end, once a provisional operating profile has been generated by the inner loop processing, the profile generation component 406 executes the outer loop 1004 of the iterative processing, which determines the total number of FFH that will be consumed as a result of operating the assets in accordance with the provisional operating profile and determines whether the number of consumed FFH satisfies the target life constraint. In general, the sum of the FFH consumed over the maintenance interval should be equal to or less than the target life (e.g., 32,000 FFH). In some embodiments, the profile generation component 406 can determine the amount of parts-life consumed over the maintenance interval based on the parts-life model data and the scheduled values of MW and T for the operating profile, such that the constraint can be given by $$\sum_{t=1}^{T_{M.I.}} FFH\_consumed(MW(t), T(t)) \le \text{target life}$$

The outer loop 1004 of the iterative processing performed by the profile generation component 406 compares the target life for the gas turbines with the total amount of FFH that would be consumed over the duration of the maintenance interval if the gas turbines were operated in accordance with the provisional operating profile. If the total consumed FFH is found to be greater than the target life (outside a defined tolerance window), it is assumed that the price of life $\lambda_0$ was underestimated during the first execution of the inner loop, and the profile generation component 406 increases the estimated price of life $\lambda_1$ for the next execution of the inner loop. Alternatively, if the total consumed FFH is found to be less than the target life (outside of a defined tolerance window), it is assumed that the estimated price of life $\lambda_0$ was overestimated during the first execution of the inner loop, and the profile generation component 406 decreases the estimated price of life $\lambda_1$ for the next execution of the inner loop. The profile generation component 406 then re-executes inner loop processing using the updated price of life value $\lambda_1$, and a new provisional operating profile is generated, wherein the new provisional operating profile comprises an updated hourly schedule of power output MW and operating temperature T calculated based on equation (2) using the same forecast data 710 and the updated price of life value $\lambda_1$. The profile generation component 406 performs multiple iterations of the inner and outer loop processing in this manner—calculating new provisional operating profiles and adjusting the price of life value $\lambda_i$ (where i is the iteration index) if the calculated amount of consumed FFH does not satisfy the target life constraint—until an optimal price of life $\lambda^*$ is found that causes the inner loop to generate an operating profile that satisfies the target life constraint.

In general, the profile generation component 406 iterates over multiple values of the price of life $\lambda_i$ in the outer loop, solving the inner loop for each for each value of $\lambda_i$, and terminating the outer loop based on the responses received from the inner loop to past price of life values. In some embodiments, the manner in which the outer loop selects the next price of life value $\lambda_i$ may depend on the past values of $\lambda_i$ and the corresponding inner loop responses. If the inner loop response to the current value of j results in violation of the target life constraint, the outer loop can decide to increase $\lambda_{i+1}$ for the next iteration, and continue to do so until the inner loop response produces an operating profile that satisfies the life target. In the other direction, if the inner loop response given a price of life value $\lambda_i$ does not violate the life target (e.g., the provisional operating profile consumes an estimated amount of FFH less than the target life), the outer loop can increase $\lambda_{i+1}$ for the next iteration to bring the estimated total consumed FFH closer to the target life. The inner and outer loop iterations can then be terminated when the consumed FFH for the current provisional operating profile is approximately equal to the target life (within a defined tolerance).

When the iterations are terminated as a result of the target life being satisfied, the user interface component 408 can output the operating profile 706 generated by the last iteration of the inner loop as the recommended operating profile for the gas turbines. The system 402 also outputs the presumed optimal price of life value $\lambda^*$ that gave rise to this operating profile. In some embodiments, the resulting operating profile can be rendered as a recommended hourly schedule of gas turbine power output and operating temperature for each day of the maintenance interval. FIG. 11 is an example display format for an operating profile. As shown in this example, each day is divided into hours (Hour Ending 1, Hour Ending 2, etc.), with each hour specifying a recommended plant output and operating temperature (exhaust temperature in this example) defined by the operating profile 706.

Figure 12:
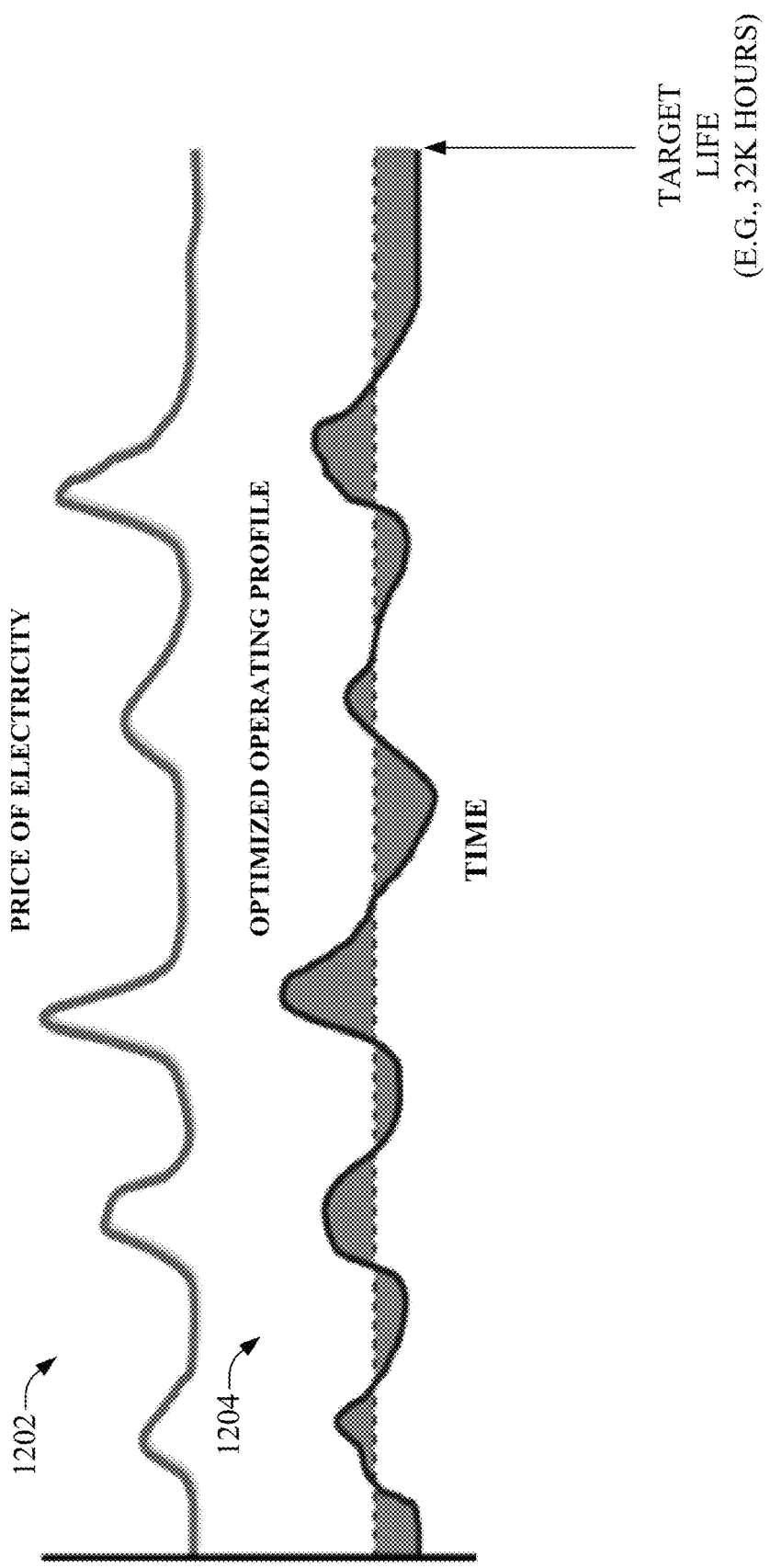
FIG. 12 is an example graphic that plots recommended operating temperature defined by an operating profile over the duration of a maintenance interval together with predicted hourly electricity prices over the same maintenance interval.

In some embodiments, the user interface component 408 can output one or more graphical representations of the optimized operating profile 606, as well as any other factors on which the profile was based. FIG. 12 is an example graphic that plots the recommended operating temperature defined by the operating profile over the duration of the maintenance interval (graph 1204) together with the predicted hourly electricity prices over the same maintenance interval (graph 1202). User interface component 408 can allow the user to add or remove variables from the graphical display (e.g., fuel prices, expected electrical demand) for comparison with the recommended operating profile.

Figure 13:
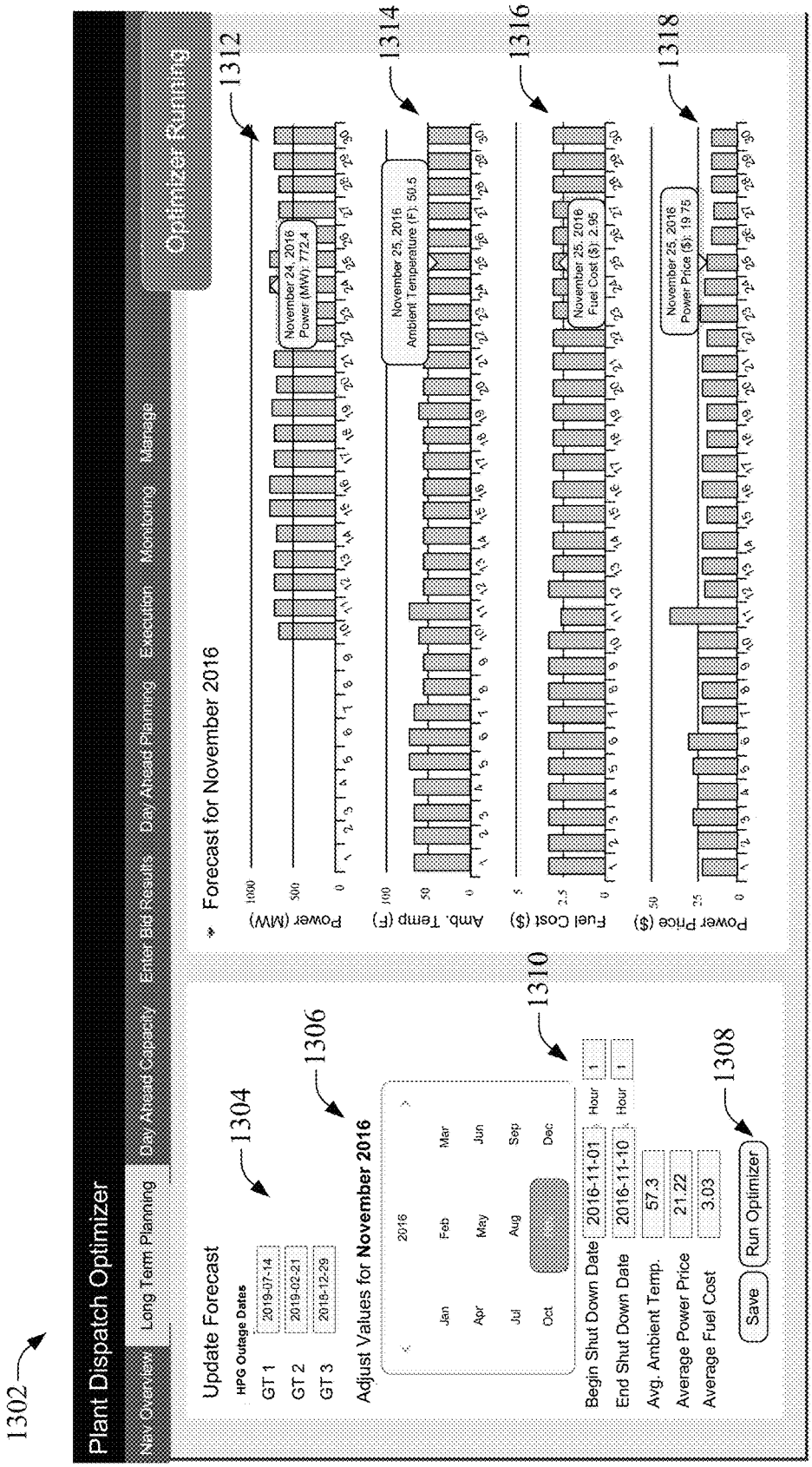
FIG. 13 is an example graphic display that can be generated by a user interface component based on results of long-term analysis.

FIG. 13 is another example graphic display 1302 that can be generated by user interface component 408 based on results of the long-term analysis described above. Graphic display 1302 is an example long-term planning display of the dispatch optimization system 402, and presents a daily view of the long-term operating profile. A power bar graph 1312 represents the daily power output for a selected month (November 2016), as determined based on the recommended hourly power outputs defined by the operating profile 706. Graph 1312 is plotted together with an ambient temperature bar graph 1314, a fuel cost bar graph 1316, and a power price bar graph 1318, representing the average daily temperatures, fuel costs, and electricity prices, respectively. The information in the ambient temperature graph 1314, fuel cost graph 1316, and power price graph 1318 can be obtained from the forecast data 710. A monthly selector graphic 1306 allows the user to select a month to be viewed and/or optimized. Outage date entry fields 1304 allows the user to enter days during which individual gas turbans will be out of service, which can be taken into consideration by the dispatch optimization system 402 when running the optimization routine (e.g., by limiting the possible power output on a given day based on the number of turbines expected to be available). A shut-down entry area 1310 allows the user to enter start and end dates for planned plant shut-downs, which is also taken into consideration by the optimization system 402. In the illustrated example, the shut-down is defined to begin on November 1 and to end on November 10, which is reflected in the power output graph 1312. When a plant shut-down is defined the profile generation component 406 assumes that no power will be output or parts-life consumed on those days, and the inner and outer loops of the iterative process are executed using these definitions as constraints. A "Run Optimizer" graphical button 1308 initiates (or re-initiates) the iterative process that generates a long-term operating profile for a maintenance interval (or other operating horizon) based on the available forecast data, plant efficiency and parts-life models, and any user-defined operating constraints (e.g., plant shut-down or asset outage dates).

Figure 14:
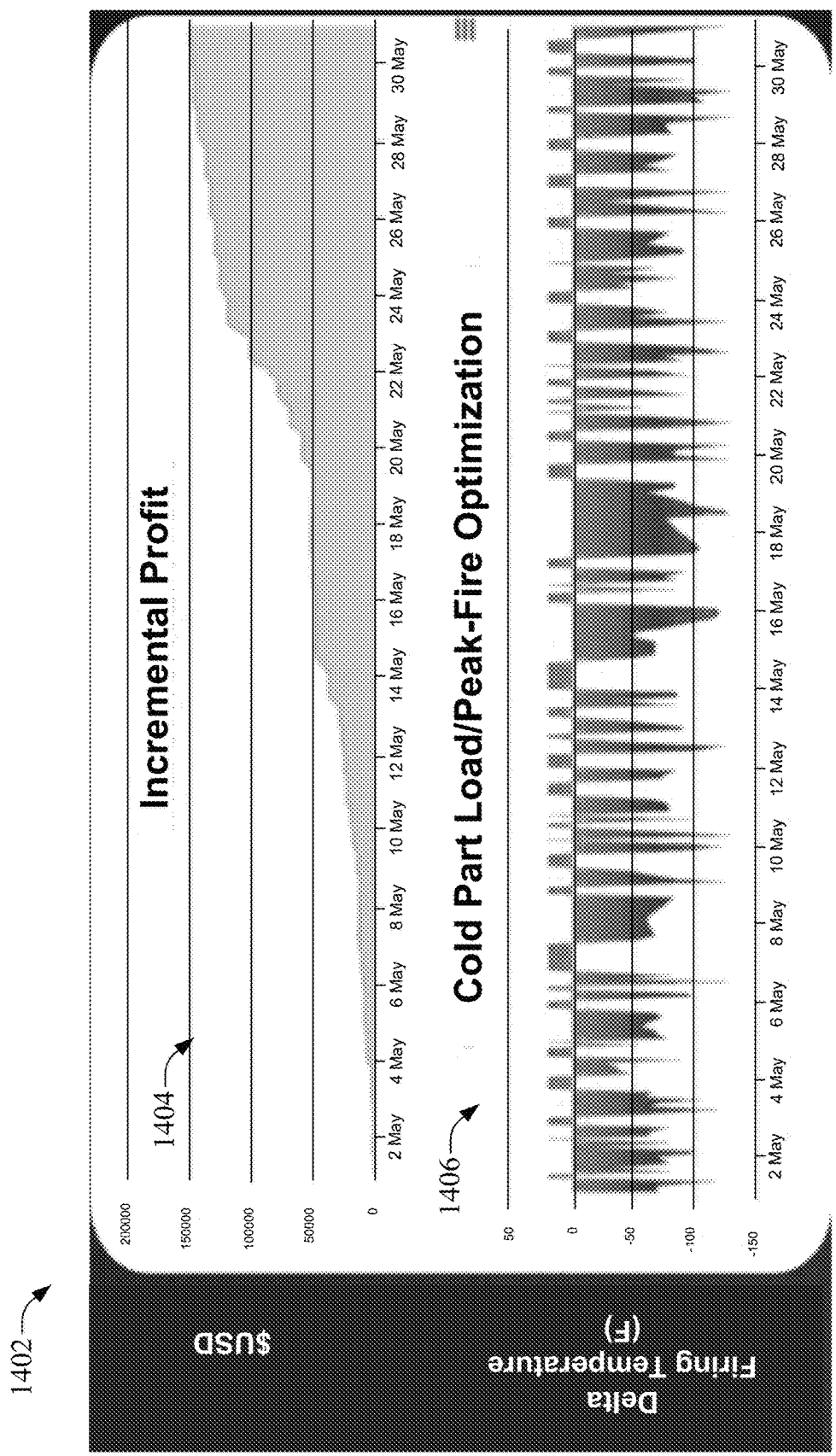
FIG. 14 is an example graphical display that can be generated by a user interface component.

FIG. 14 is another example graphical display 1402 that can be generated by user interface component 408 according to one or more embodiments. Graph 1406 represents the hourly operating temperature defined by the operating profile 706, depicted in terms of the deviation of the operating temperature from baseline operation (referred to as the delta firing temperature). Temperatures that fall below a certain delta temperature represent CPL operation, during which FFH (or other units of parts-life) are banked, while temperatures above the baseline (the zero axis of graph 1406) represent peak-fire operation during which FFH are consumed. Graph 1404, plotted over the same timeline as graph 1406, illustrates the expected incremental profit generated over the maintenance interval as a result of operating the plant assets in accordance with the operating profile 706. The incremental profit can be calculated by the parts-life metric component 412 as an hourly cumulative value based on equation (2) above (or another suitable profit equation that includes the price of life as a factor) using the forecasted fuel and electricity price data and the recommended values of MW and T defined by the operating profile 706 for each hour.

In some embodiments, the cold part load/peak-fire optimization curve plotted in graph 1406 can be color-coded to more clearly convey the CPL and peak-fire periods. For example, portions of the curve that fall below the delta temperature representing CPL operation can be colored blue, while portions of the curve that exceed the zero delta—representing peak-fire operation—can be colored red.

It is to be appreciated that the manner in which the long-term operating profile for the maintenance interval is presented by the user interface component 408 is not limited to the examples illustrated herein. Rather, information relating to the hourly or daily recommended operating schedule, the forecasted ambient and market information, parts-life savings and utilization, and profit calculations can be presented in any suitable format, and in any combination, without departing from the scope of one or more embodiments of this disclosure.

In some embodiments, in addition to generating graphical reports and guides based on the long-term operating profile 706, the control interface component 414 of the dispatch optimization system 402 can export the long-term operating profile to a plant asset control or scheduling system, so that that the operating schedule represented by the profile is automatically programmed into the asset's control system.

The nominal long-term operating profile 706 generated by the profile generation component 406 is based on predicted ambient and market conditions represented by the forecast data 710. However, during subsequent real-time operation of the power-generating plant assets during the maintenance interval, it is likely that the actual ambient conditions, fuel costs, and electricity prices will deviate from their corresponding predicted values represented by forecast data 710. Accordingly, while the long-term operating profile 706 can be beneficially used for long-term planning prior to the start of the maintenance interval being planned, the dispatch optimization system 402 can update the operating profile during the maintenance interval based on updated, real-time ambient and market information, as well as actual asset operation information (both real-time and historical). As will be described in more detail below, updated iterations of the inner and outer loop can be performed in connection with both day-ahead and real-time (i.e., same day, or hourly) planning and operations.

Figure 15:
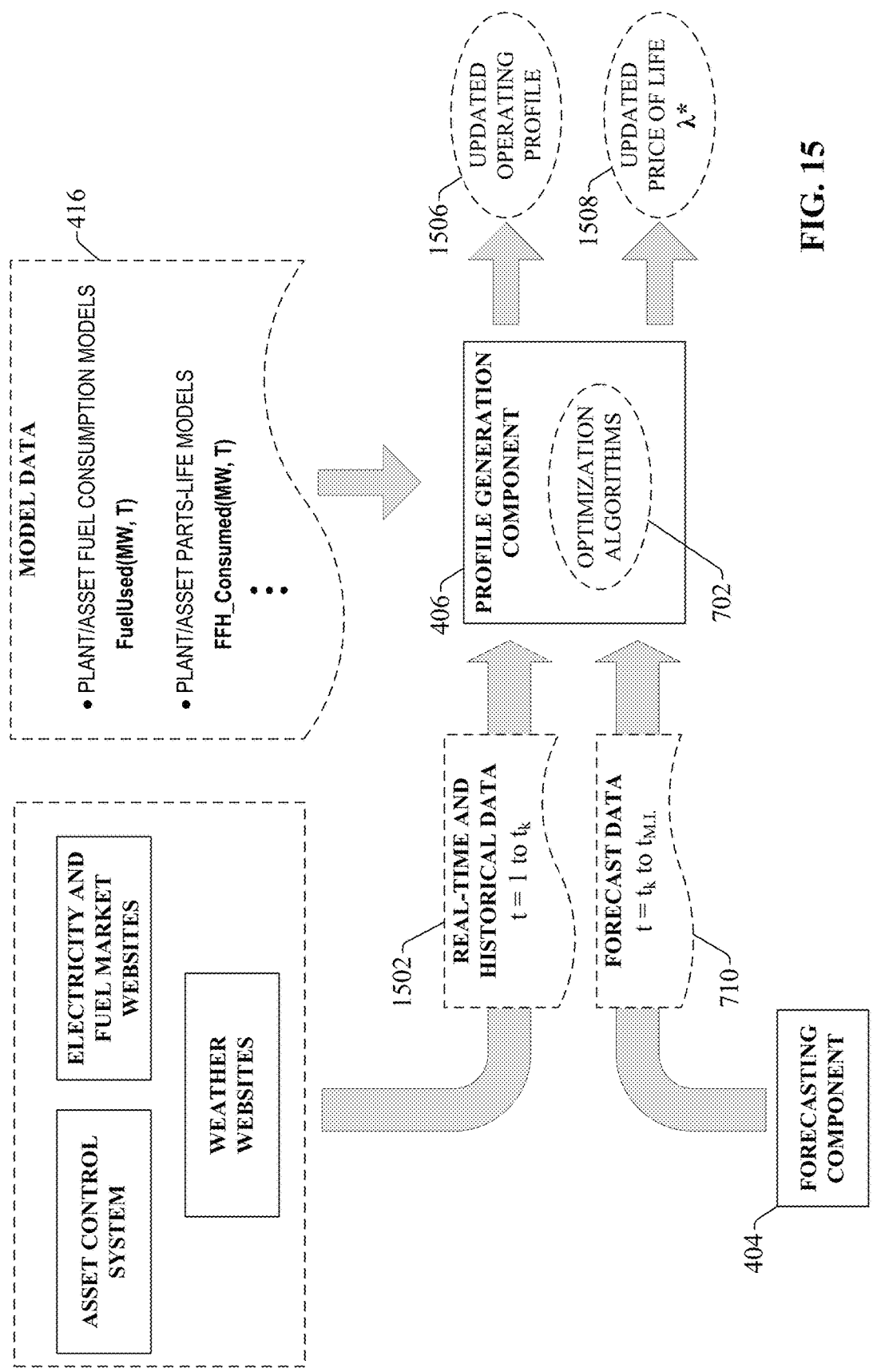
FIG. 15 is a block diagram illustrating example data inputs and outputs for a profile generation component of the dispatch optimization system during day-ahead and real-time planning and execution.

FIG. 15 is a block diagram illustrating example data inputs and outputs for the profile generation component 406 of the dispatch optimization system 402 during the day-ahead and real-time planning and execution. During operation of the plant assets within the maintenance interval, the dispatch optimization system 402 can be provided with updated forecast data 710 for at least a portion of the remainder of the maintenance interval (e.g., $t=t_k$ to $t_{M.I.}$, where $t_k$ is the present time and $t_{M.I.}$ is the end of the maintenance interval or operating horizon). The dispatch optimization system 402 can also be provided with real-time and historical data 1502 for the present time and at least a subset of the previous duration of the maintenance interval (e.g., t=1 to $t_k$). This real-time and historical data 1502 can include, for example, updated electricity and fuel price data obtained from appropriate market websites or other sources of market data, updated ambient data obtained from weather forecasting websites, historical operating data representing actual past operation of the plant assets (e.g., historical hourly power output and operating temperatures for previous hours of the maintenance interval) obtained from the asset control system, or other such data. Some or all of the real-time and historical data 1502 can be obtained from the respective data sources by real-time data acquisition component 410. The profile generation component 406 can substitute this updated real-time and historical data 1502 for previously forecasted information, and re-execute the iterative analysis described above in connection with FIG. 10 to yield an updated operating profile 1506 to facilitate day-ahead planning or real-time planning and execution. Re-executing the profile generation sequence using actual historical operating data for past hours of the maintenance interval allows the operating plan to be updated to reflect actual historical operation of the plant assets, which may deviate from the predicted operation defined by the previously generated long-term operating profile.

The profile generation component 406 will also generate an updated price of life value 1508 based on the real-time and historical data 1502 (as well as the updated forecast data 710), which can be used in a number of ways to present operation planning recommendations to the user in meaningful ways. As will be described below, the updated price of life value also serves as a real-time feedback mechanism to ensure that asset operation will converge on the target life constraint even if past operation has deviated from forecasted performance (e.g., by excessive peak-firing or CPL operation), while also substantially maximizing profit for the remainder of the maintenance interval. In some embodiments, during day-ahead or real-time planning, the profile generation component 406 can selectively execute either the inner loop only in order to generate an updated operating profile 1506 using the updated forecast and real-time data together with the current value of the optimal price of life $\lambda^*$, or both the inner and outer loop in order to generate both an updated operating profile 1506 and an updated optimal price of life value $\lambda^*$.

In an example implementation, during operation within the maintenance interval, the profile generation component 406 may run both the inner and outer loop iterations only once per day based on the new forecast data 710 and real-time and historical data 1502 in order to yield an updated optimal price of life value $\lambda^*$ 1508 and an updated operating profile 1506. The new price of life $\lambda^*$ and updated operating profile can be used to generate a nominal day-ahead schedule for the next operating day. When the new day has begun, the profile generation component 406 can execute, on a more frequent basis (e.g., every hour or every few minutes), the inner loop only—using the updated optimal price of life, the updated forecast data 710, and the real-time conditions—in order to generate updated operating recommendations (e.g., CPL and peak-fire recommendation data).

Execution of the inner and outer loop iterations during the maintenance interval for day-ahead and real-time planning is similar to the iterative sequence performed during the long-term planning stage (prior to the start of the maintenance interval), with previously provided forecast data replaced with real-time and actual historical operation data as appropriate. When the loops are executed during the maintenance interval for day-ahead or real-time planning, the profile generation component 406 can use current ambient and market data as well as updated forecast data 710 to solve the inner loop maximization for the current hour and each remaining hour of the maintenance interval (e.g., for times t=$t_k$ to $t_{M.I.}$). The profile generation component 406 can use the current value of the optimal price of life $\lambda^*$ (that is, the optimal price of life value obtained during the most recent previous inner and outer loop execution) as the initial price of life value 1006 (see FIG. 10). For the portion of the maintenance interval that has already passed (times t=1 to $t_k$), the profile generation component 406 can calculate the actual amount of parts-life that has already been consumed (including parts-life that has been banked as a result of CPL operation thus far during the maintenance interval) based on the actual historical operating data (that is, the actual hourly values of MW and T for times t=1 to $t_k$).

If only the inner loop is to be executed, the updated operating profile 1506 produced as a result of maximizing the profit for the remaining hours of the maintenance interval is taken to be the new operating profile, and the iteration is terminated. When only the inner loop is being re-executed, the previously obtained optimal price of life value $\lambda^*$ is assumed to still be accurate, and the updated operating profile 1506 is generated based on this previously obtained optimal price of life $\lambda^*$.

If the outer loop also to be executed (typically less frequently than execution of the inner loop alone; e.g., once a day), the profile generation component 406 can determine the sum of the actual amount of parts-life consumed during the past portion of the maintenance interval and the predicted amount of parts-life that will be consumed over the remainder of the maintenance interval as a result of executing the assets in accordance with the updated operating profile. As noted above, the profile generation component 406 can calculate the actual amount of parts-life that has already been consumed based on the actual historical operating data (that is, the actual hourly values of MW and T for times t=1 to $t_k$) and the parts-life model data for the assets. Once the sum of actual consumed parts-life and predicted parts-life consumption has been determined, the profile generation component 406 can determine, as the outer loop analyses, whether this sum satisfies the parts-life constraint, adjust the optimal parts life $\lambda^*$ as needed, and re-execute the inner loop. Similar to the long-term planning analysis, the inner and outer loops are iterated in this manner until the sum of the actual and predicted consumed parts-life satisfies the target parts-life constraint. In general, the outer loop constraint for generation of the updated operating profile 1506 and updated price of life 1508 during the maintenance interval for day-ahead or real-time planning can be given by $$\sum_{t=1}^{t_k} FFH_{consumed(MW_{act}(t),T_{act}(t))} + \sum_{t=t_k}^{t_{M.I.}} FFH_{consumed(MW(t),T(t))} \leq \text{target life}$$

where $MW_{act}(t)$ and $T_{act}(t)$ are the actual values of the power output and operating temperature, respectively, based on historical operation of the plant assets during the maintenance interval up to the present time (t=1 to $t_k$), and MW(t) and T(t) are the future values of MW and T defined in the updated operating profile 1506 for each hour (t=$t_k$ to $t_{M.I.}$) remaining in the maintenance interval. $FFH_{consumed}(\bullet)$ are the plant/asset parts-life models included in model data 416. Reiterating the inner and outer loop processing on a daily basis (or on another time basis) during operation within the maintenance interval can refine the recommended operating profile based on real-time conditions and actual historical operational data without significantly changing the operating horizon of the assets.

The dispatch optimization system 402 can use the information generated by the profile generation component—including the updated operating profile 1506 and the estimated optimal price of life $\lambda^*$—to present meaningful information to plant operators and managers intended to guide optimal and profitable operation of the plant assets. This can include, for example, reporting the value of parts-life saved under given operating conditions in terms of the amount of MWh of peak-firing the saved parts-life is worth, reporting the estimated number of hours of peak-fire that can be performed before running out of banked parts-life credited as a result of previous CPL operation (e.g., banked FFH), reporting the quantity of parts-life that would be saved by operating in CPL mode at the present time in terms of the number of MWh of peak-fire that will be credited, the favorability of operating in CPL mode at the present time in terms of incremental fuel burned versus the credited MWh, or other such metrics. These metrics can be generated by the parts-life metric component 412 based on available data (current operating profile, estimated optimal price of life, current and forecasted ambient and market data, historical operating data, etc.).

Figure 16:
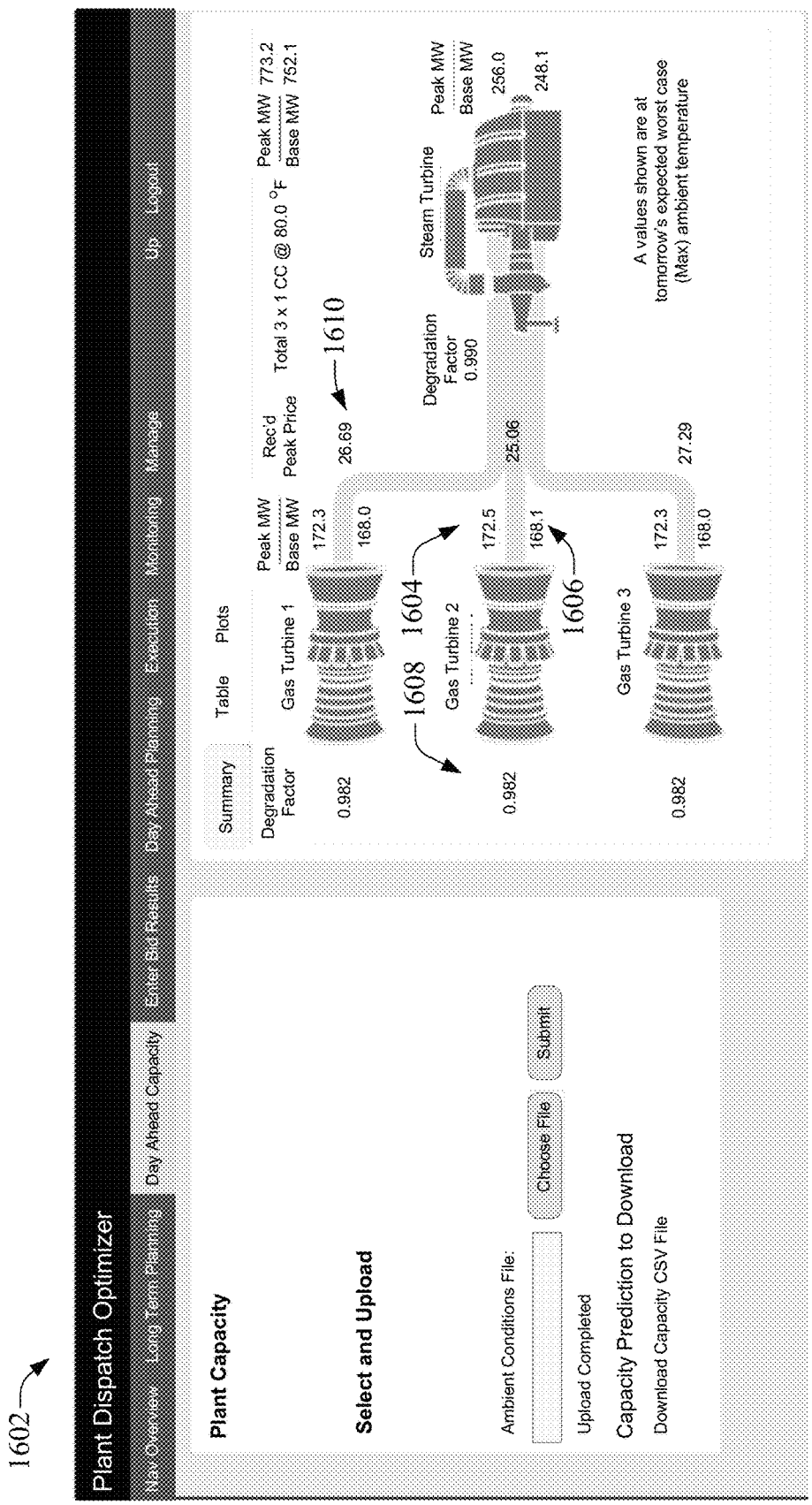
FIG. 16 is an example display screen that presents day-ahead capacity information generated by the dispatch optimization system.

FIG. 16 is an example display screen 1602 that presents day-ahead capacity information generated by the dispatch optimization system 402. Information presented on day-ahead planning displays can serve as guides for plant managers or next-day traders in connection with determining whether there is a cost benefit to peak-firing plant assets the next day, and determining a minimum price at which the additional output should be sold. Day-ahead capacity display screen 1602 (or a similar display screen) can be invoked via an overview display screen such as display 602 illustrated in FIG. 6. In this example, display screen 1602, which can be generated by user interface component 408, displays day-ahead planning information for a 3×1 combined cycle plant, comprising three gas turbines (Gas Turbines 1, 2, and 3), a heat recovery steam generator, and a steam turbine. Display screen 1602 overlays capacity information on a graphic representing the 3×1 system. For each gas turbine, the user interface component 408 displays the next-day peak capacity 1604, baseline capacity 1606, and degradation factor 1608. Display screen 1602 also displays, for each gas turbine, the recommended minimum peak electricity price 1610 at which to sell peak output of the gas turbine for the next day. The parts-life metric component 412 can calculate the recommended minimum peak electricity price based on the long-term data defined in the operating profile, the optimal price of life value $\lambda^*$, and the forecasted market data.

Figure 17:
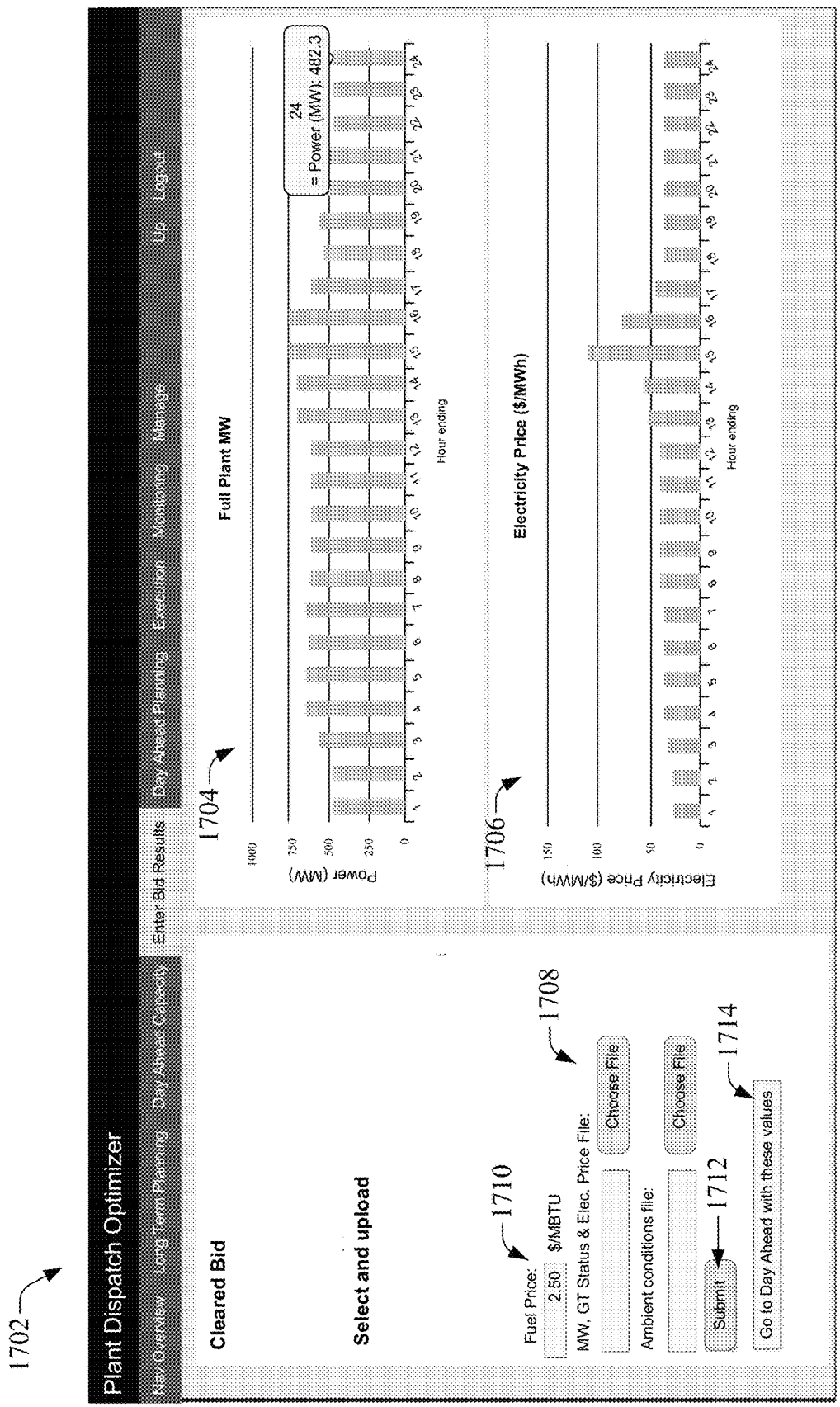
FIG. 17 is an example display screen that allows a user to enter day-ahead cleared bid and operating information for the next operating day.

FIG. 17 is an example display screen 1702 that allows a user to enter day-ahead bid and operating information for the next operating day. Example display screen 1702 includes a plant output bar chart 1704 that graphically illustrates the planned hourly output for the plant for the next day. In some scenarios, the planned output may be derived from the recommended hourly MW defined in the updated operating profile 1506. Alternatively, the planned output values may be entered by the user based on known conditions (e.g., expected available gas turbine capacities, maintenance schedules, expected demand, etc.). Display screen 1702 also includes an electricity price bar chart 1706 indicating the cleared hourly electricity prices for the next day. These prices may be obtained by the system 402 from forecast data 710, or may be entered by the user as minimum prices that have been approved for each hour.

In this example, a file selection area 1708 allows a user to enter one or more of updated ambient condition data, updated electricity price data, gas turbine status data (e.g., available or unavailable), or updated power output limits for the next day (or beyond). Although the illustrated example depicts the ability to manually provide this updated information, in some embodiments of the real-time data acquisition component 410 can obtain at least some of this information automatically from relevant sources (e.g., weather forecast websites, electricity market websites, maintenance databases, etc.). Display screen 1702 also includes a field 1710 that allows the user to enter an updated expected fuel price (e.g., in $/MBTU) for the day ahead. A Submit button 1712 allows the user to initiate another execution of the optimization sequence based on the updated information provided by the user. In some embodiments, both the inner and outer loop will be re-executed in response to initiation of the optimization sequence for day-ahead planning, resulting in both an updated operating profile and an updated price of life value $\lambda^*$. When the optimization sequence is complete, the system 402 can update the values depicted in charts 1704 and 1706 to reflect the new nominal output schedule for the next day. The system 402 can also allow the user to modify one or more of the MW or electricity price values if desired through interaction with the display screen 1702. Upon approval of the nominal output schedule and pricing, selection of button 1714 causes the system to proceed to the day-ahead planning display screen using the nominal values.

Figure 18:
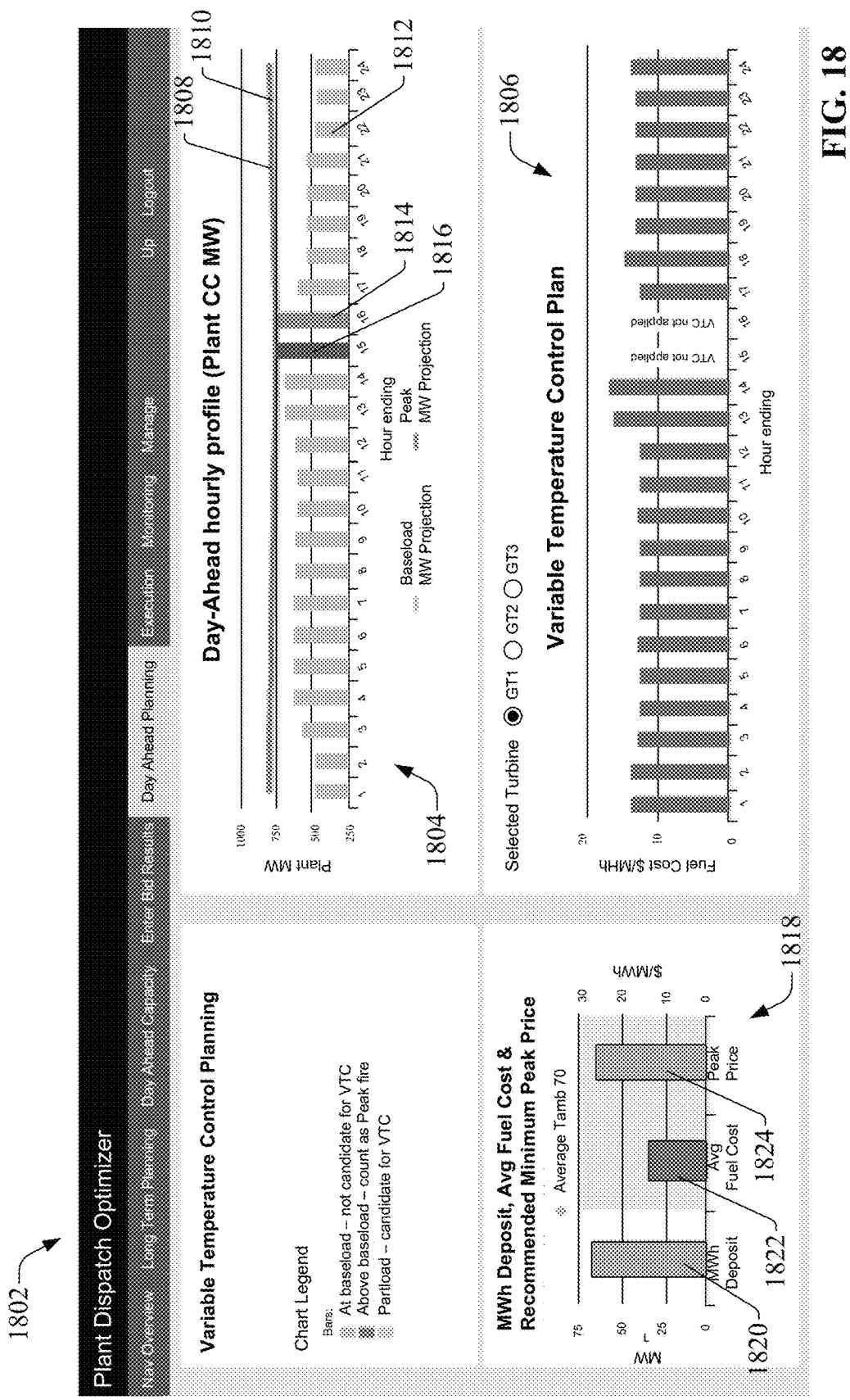
FIG. 18 is an example day-ahead planning display screen.

FIG. 18 is an example day-ahead planning display screen 1802. Display screen 1802 includes an hourly output profile bar chart 1804 representing the hourly MW output defined by the updated operating profile 1506 (including any modifications to the profile or associated constraints entered by the user via display screen 1702). The hourly output data is charted together with lines 1808 and 1810 representing the peak load MW projection and baseload MW projection, respectively. The bars for each hour can be color-coded to readily identify hours that are good candidates for saving parts-life by running the plant assets in CPL operation (also referred to as variable temperature control, or VTC). For example, hours with light-shaded bars (e.g., bar 1812) represent hours during which the assets will be running at part-load, and are therefore candidates for CPL operation. Hours with medium-shaded bars (e.g., bar 1814) represent hours during which the assets are expected to be running at baseload, and therefore are not candidates for CPL operation. Hours with dark-shaded bars (e.g., bar 1816) represent hours during which the assets may beneficially be peak fired to run above base load—thereby generating one or more extra MWh for sale—provided the additional parts-life cost associated with peak-firing has been compensated for by CPL operation at another time during the maintenance interval.

Display screen 1802 also includes an hourly fuel cost bar chart 1806, which is populated with fuel cost data (in $/MBtu) obtained from the forecast data 710. In the illustrated example, in order to compensate for the additional parts-life consumed by peak-fire operation, for example at Hour Ending 15, the assets can be operated in CPL mode during one or more other hours during the day that are indicated as being candidates for CPL operation (VTC). Since CPL operation is less fuel-efficient, the amount of parts-life saved, equivalently peak-fire MWh credited, by CPL operation during a given hour has an associated cost (e.g., fuel price [$/MBtu]×extra CPL fuel [MBtu]) that is at least partly a function of the fuel cost for that hour. In the illustrated example, the favorability of operating in CPL for the different candidate hours during the day is displayed in plot 1806 as a ratio of the aforementioned CPL fuel costs for those hours and the respective peak-fire MWh credits—a quantity in $/MWh. Accordingly, based on information generated by the optimization sequence, the dispatch optimization system 402 can automatically select which of the CPL-eligible hours are optimal times during which to operate in CPL mode in order to generate banked parts-life (e.g., FFH) that can be consumed during the peak-fire hour. Since the optimization system 402 computes a maximum $/MWh at which it is worth saving parts-life, the system can select one or more hours during which the fuel costs are at or below this parts-life cost, and flag these hours for CPL operation. Alternatively, in some embodiments, the decision of which hours to operate in CPL mode and the extent of CPL operation at such hours may be left to the user to decide on the basis of the various guiding metrics.

A MWh deposit area 1818 of display screen 1802 conveys a total amount of MWh savings accumulated for the 24-hour day-ahead period. In this example, bar 1820 represents the total amount of MWh projected to be banked as a result of CPL operation over the ensuing 24-hour period. This value represents the number of banked (or credited) peak-fire MWh that can be generated during the maintenance interval without violating the target life constraint as a result of the parts-life saved from CPL operation during the 24-hour period.

Bar 1822 represents the average fuel cost per saved MWh over the 24-hour period. Bar 1824 represents a recommended electricity price ($/MWh) at which to peak-fire the plant assets to deploy the banked MWh. This recommended price is based on the fuel costs incurred as a result of banking the additional MWh through CPL operation. The difference between the recommended peak price 1824 and the average fuel cost 1822 represents the incremental profit generated as a result of deploying the banked MWh at the indicated peak electricity price. In some embodiments, the system 402 can identify suitable peak-fire hours during which the assets can profitably generate MWh based, at least in part, on a determination of which hours are associated with forecasted electricity prices that are equal to or greater than the recommended minimum peak price represented by bar 1824. In such embodiments, the user interface component 408 may identify these recommended peak-fire hours on the day-ahead hourly profile chart 1804 by color-coding the bars associated with those hours.

In various embodiments, the dispatch optimization system 402 can be configured to perform either automatic or advisory actions in response to CPL operation or peak-fire decisions. For example, in some scenarios, once suitable hours of CPL operation have been identified, the control interface component 414 of the dispatch optimization system 402 can automatically instruct the plant asset control system to operate in CPL mode during the selected hours. Alternatively, the system 402 may only indicate the recommended hours of CPL operation to the user via display screen 1802 (or another display screen), allowing the user to manually set the recommended CPL operation according to their own discretion. Similarly, when the optimization system 402 has identified suitable hours during which to peak-fire the assets in order to consume banked MWh, the system 402 can either automatically configure the asset control system to carry out the recommended peak-fire operations or convey the recommendation to the user. The user may also configure the dispatch optimization system 402 to enact a mix of automatic and advisory control. For example, a user may decide to configure the system 402 such that CPL operation decisions are automatically implemented by the control interface component 414, while peak-fire operation decisions are advisory-only, requiring the user to manually set peak-fire operation.

The day-ahead plan depicted on display screen 1802 represents a nominal operating plant for the next day. Plant personnel can use this day-ahead information as a nominal starting point for the day's operations, which will be refined in real-time based on actual real-time conditions and the most recently calculated price of life value $\lambda^*$, which represents the sensitivity between parts-life and profit.

Figure 19:
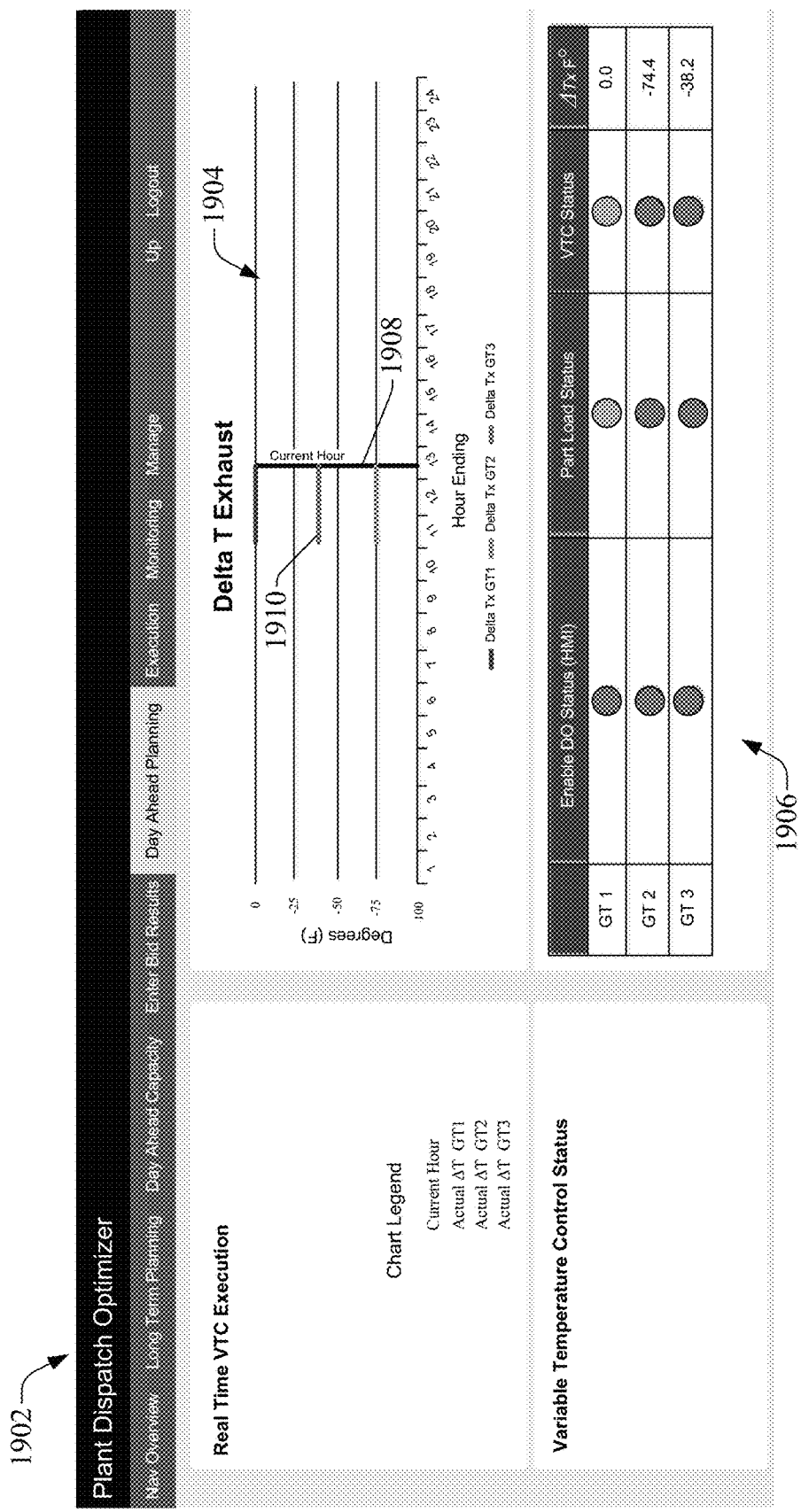
FIG. 19 is an example real-time execution display screen that can be generated by a user interface component of the dispatch optimization system.

The optimization system 402 can generate real-time planning and execution screens that allow the user to monitor the plant assets during execution of the plan and, if desired, modify operation relative to the day-ahead plan. FIG. 19 is an example real-time execution display screen 1902 that can be generated by the user interface component 408 of the dispatch optimization system 402. Display screen 1902 is intended for use during operation of the plant assets for the current day, and may be suitable for use by plant operators.

In this example, display screen 1902 includes a VTC status area 1906 identifying the part load and VTC statuses for the three gas turbines (GT 1, GT 2, and GT 3). The first column of VTC status area 1906 indicates the dispatch optimization enable statuses for the gas turbines. When the indicator in this column is green, the CPL operation for the corresponding gas turbine is running under the control of the optimization system 402, such that the optimization system 402 controls which hours the plant assets are operated in CPL mode based on current real-time conditions and the presumed optimal price of live value $\lambda^*$ (calculated by the most recent execution of the inner and outer loop iterations by the profile generation component 406). In some embodiments, operators can manually enable and disable optimizer control of CPL operation as desired, either through interaction with an appropriate display screen of the optimization system 402 or through an external control of the plant asset control system.

The last column of the VTC status area 1906 displays the current delta temperature relative to nominal operating temperature (e.g., the hot load path of FIG. 2) for the three gas turbines, respectively. As indicated in the fields of this column, gas turbine 1 is currently running at nominal operating temperature with a delta temperature of zero, gas turbine 2 is currently running 74.4° F. below the nominal operating temperature, and gas turbine 3 is currently running 38.2° F. below the nominal operating temperature. An appropriate delta temperature (also referred to as the VTC shift) for each turbine can be calculated by the parts-life metric component 412 based on the optimized operating profile 1506. The VTC shift (that is, the extent of CPL operation as given by the delta temperature) is a function of the current load on the respective gas turbines and the current operating temperature (e.g., exhaust temperature in the present example) of the respective gas turbines, as well as the electricity and fuel prices for the current hour obtained from the day-ahead data previously obtained by the system 402, together with the price of life value $\lambda^*$. For example, for gas turbine 2, the optimization system 402 has determined that CPL operation at a delta temperature of −74.4° F. yields, for the present hour, an optimal trade-off between parts-life saved and profit given the current fuel and electricity prices as well as the determined price of life λ* (which is an estimated metric representing optimal trade-off between parts-life and profit).

For closed-loop control of the plant assets during real-time operation, the dispatch optimization system 402 can determine the optimal degree of CPL operation based on the current price of life value and current ambient and operating conditions, and automatically set the delta temperature in accordance with this calculated optimal degree of CPL operation. In an example approach, the parts-life metrics component 412 can use the optimal price of life value λ* determined during the day-ahead planning phase to calculate the extent of CPL operation based on current conditions by determining the operating temperature T that maximizes the profit given by equation (2) (or a similar profit relationship), where all other variables used in the equation (e.g., the MW output) are current values. In another approach, the outputs of the planning phase can be viewed as an allocation of parts-life savings to different conditions or durations (e.g., daily, hourly, etc.). The operating temperature T can then be suppressed at any given instant to the extent that the present parts-life saving is close to (or consistent with) that allocated for the appropriate allocation "bucket" determined by the present condition or instant.

The second column of VTC status area 1906 represents the current part load status for the respective gas turbines. Since gas turbine 1 is currently running with a zero delta temperature, the part load status indicator for gas turbine 1 conveys that the gas turbine is not currently running in cold part-load mode. Gas turbines 2 and 3 are currently running in CPL mode (as given by their respective negative delta temperatures).

The third column of VTC status area 1906 represents the VTC status for the respective gas turbines. This indicator conveys whether the respective gas turbines are currently having their CPL operation controlled in accordance with VTC.

The real-time variable temperature control (VTC) shift that is applied to each of the gas turbines is also conveyed graphically on chart 1904 of displays screen 1902. Vertical line 1908 represents the current hour of operation, and the three horizontal lines 1910 represent the delta temperatures relative to baseline temperature for the three gas turbines, respectively (which correspond to the values given in the last column of VTC status area 1906).

During real-time (same day) operations, the price of life value λ* may be assumed to be the same throughout the day. Accordingly, as noted above, the optimization system 402 may only re-execute both the inner loop and outer loop iterations once per day in order to obtain an updated daily estimate of the price of life λ* 1508 given the actual historical operation and forecasted conditions for the remainder of the maintenance interval. This allows the price of life λ* to be adjusted to reflect any deviations in the expected daily parts-life creation or consumption relative to the long-term prediction (based on forecasted information) after operation of the plant assets within the maintenance interval has begun. For example, after the fifth day of operation within the maintenance interval, the dispatch optimization system 402 can re-execute the inner and outer loop iterations using the actual historical operating data (e.g., hourly actual MW and T values) for the first five days of operation, and forecasted ambient and market data for the remaining hours of the maintenance interval (as described above in connection with FIG. 15). This re-execution yields a new price of life value λ*, which may be different than the original price of life value calculated during the long-term planning stage if the actual amount of parts-life created or consumed during the first five days of operation deviates from the predicted amount of parts-life for those days.

Once the new day has begun, the dispatch optimization system 402 can, on an hourly basis or at any desired frequency, re-execute the inner loop only on an hourly basis (or at any desired frequency; e.g., at a frequency that matches the time base of the maintenance interval) using the updated price of life value λ*, as well as current real-time electricity prices, load, and ambient conditions. The results of these inner loop executions (e.g., the hourly values of MW and T defined by the resulting operating profile) can be used as a basis for hourly CPL operating decisions. In this way, the price of life value λ* serves as a real-time feedback mechanism for keeping plant asset operation on track for satisfying the target parts-life constraint, even if the plant assets have been operated during the interval in a manner that deviates from the long-term prediction. For example, if the plant assets are peak-fired over the course of the first few days of the maintenance interval in excess of the recommended peak-fire periods defined by the original long-term operating profile, the daily outer loop execution will cause the price of life value λ* to increase each day, so that subsequent executions of the inner loop will yield CPL and peak-fire recommendations that compensate for this unexpected excessive peak-firing and bring operation in line to satisfy the target life.

Figure 20:
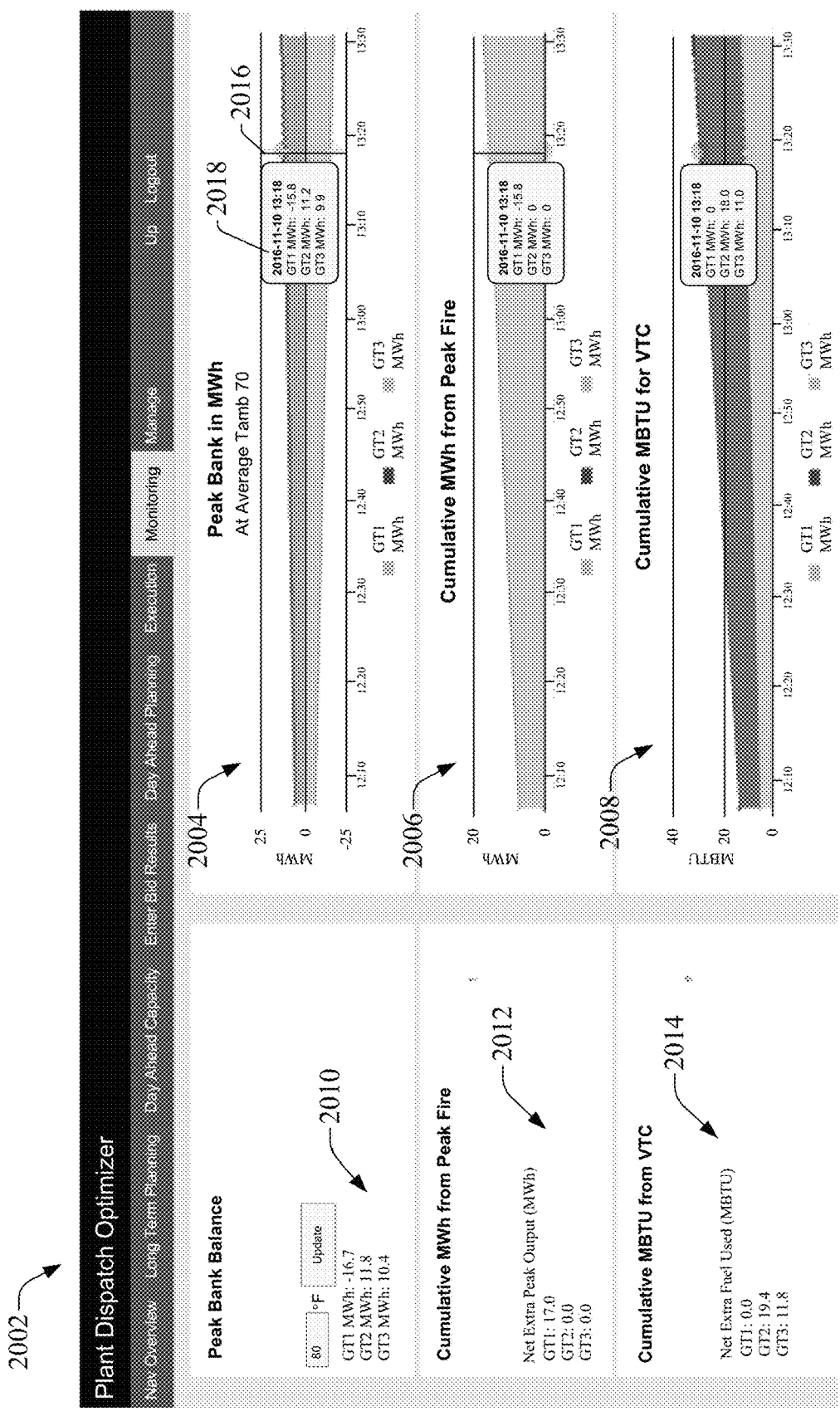
FIG. 20 is an example real-time monitoring display screen that can be generated by a user interface component of the dispatch optimization system.

FIG. 20 is an example real-time monitoring display screen 2002 that can be generated by the user interface component 408 of the dispatch optimization system 402. Display screen 2002 displays current and historical cumulative information for the three gas turbines for the most recent 90-minute period.

The left side of the display screen 2002 includes a peak bank balance area 2010 that displays the current or instantaneous cumulative balance of banked MWh for the three gas turbines. The banked MWh value for each gas turbine can be calculated by the parts-life metric component 412 based on the net amount of parts-life or consumed as a result of CPL and peak-fire operations. For example, in the example depicted in FIG. 20, gas turbine has −16.7 MWh of peak-fire power available, since gas turbine 1 has peak-fired excessively during the maintenance interval without completely compensating for the consumed parts-life by CPL operation. The amount of parts-life deficit resulting from this operation is translated to a MWh value (−16.7 MWh), which represents the amount of MWh that must be compensated for by CPL operation before the end of the maintenance interval in order to ensure that the target life for the asset is satisfied. By contrast, gas turbine 2 has banked more parts-life as a result of CPL operation than it has consumed by peak-firing, resulting in a positive peak MWh bank of 11.8 MWh. This value represents a translation of the banked parts-life into MWh available for peak firing.

Display screen 2002 also includes a peak bank balance graph 2004 to the right of peak bank balance area 2010. Peak bank balance graph 2004 plots the historical balance of banked MWh over time for each of the three gas turbines for the most recent 90-minute period. A vertical slider bar 2016 can be selected and dragged across the graph 2004, and an overlaid window 2018 can render the numerical values associated with a point in time corresponding to the slider bar 2016.

Display screen 2002 also includes a cumulative peak-fire MWh area 2012 that displays cumulative net amount of additional MWh generated by peak-fire operation. Ideally, the cumulative peak-fire MWh will be generated through the consumption of banked MWh that were banked by CPL operation, or will be compensated for with banked MWh created through future CPL operation within the maintenance interval. In the illustrated example, gas turbine 1 has generated 17.0 MWh of additional power output through peak-firing, while gas turbines 2 and 3 have not yet used any of their banked MWh (11.8 and 10.4, respectively) for peak-firing during the current maintenance interval. A cumulative peak-fire graph 2006—to the right of area 2012—plots the cumulative number of extra MWh generated over time for the three gas turbines for the most recent 90-minute period. In general, the price at which the additional peak-fired MWh were sold represents the gross revenue resulting from peak-firing of banked MWh (the positive portion of profit).

To obtain the banked MWh values rendered on displays screen 2002, the optimization system 402 (e.g., the parts-life metric component 412) can first compute the number of extra FFH created through CPL operation and the number of FFH consumed through peak-fire operation from the start of the current maintenance interval through the present time. These FFH value can be derived, for example, based on the parts-life model data for the assets together with the hourly historical operation data for the assets (e.g., the actual plant output MW and operating temperature T for each hour of the maintenance interval thus far). The optimization system 402 can then determine the net FFH credit or deficit based on the difference between the created and consumed FFH values, and convert this net number of FFH to a corresponding MWh value. This conversion can be determined based on the peak-fire capacity of the respective assets and the amount of peak-fire MWh that a given gas turbine can produce for each FFH, which are determined from the performance and parts-life models of the asset, respectively. This conversion technique is only intended to be exemplary, and any suitable calculation for converting a parts-life metric (e.g., FFH) to a corresponding peak-fire MWh value is within the scope of one or more embodiments of this disclosure.

A cumulative MBTU area 2014 of display screen 2002 displays the instantaneous accumulated extra fuel (in thousands of British thermal units, or MBTUs) that has been consumed for each gas turbine as a result of CPL operation in order to create banked MWh for peak-firing. In the illustrated example, gas turbine 1 has not yet operating in CPL mode, and therefore has not consumed additional fuel as a result of CPL operation (hence, the negative peak bank balance for gas turbine 1 as a result of the 17.0 MWh of peak-fire output). Gas turbines 2 and 3 have consumed 19.4 and 11.0 MBTU of additional fuel as a result of CPL operation thus far during the current maintenance interval (resulting in the 11.8 and 10.4 MWh, respectively, of banked peak MWh indicated in area 2010, which have not yet been consumed through peak-firing). Cumulative MBTU graph 2008 to the right of area 2014 plots the cumulative amount of extra fuel consumed through CPL operation for the three gas turbines over the most recent 90-minute period. As indicated by graph 2008, gas turbines 2 and 3 are currently operating in CPL mode, resulting in both an increasing amount of fuel consumed (graph 2008) and an increasing number of banked MWh (graph 2004) for those two assets. In general, the price of the fuel consumed represents the costs associated with saving the MWh that are deployed during peak-firing (the negative portion of profit).

The cumulative amount of extra fuel consumed as a result of past CPL operation can be computed by the system 402 (e.g., the parts-life metric component 412) based on the parts-life model data together with the historical hourly operational data (e.g., the actual power output MW and operating temperature T for each previous hour of the maintenance interval). Alternatively, the amount of fuel consumed rendered on display screen 2002 can be based on actual measured fuel consumption by the assets.

The information rendered on monitoring display screen 2002 translates the parts-life metrics tracked by the dispatch optimization system 402 into terms that a plant manager or operator is likely to find useful; namely, indications of MWh that are available for peak-firing (or, conversely, indications of MWh that must be compensated for as a result of excessive peak-firing), and a quantity of fuel consumed in order to create banked MWh for peak-firing. Thus, the information on display screen 2002 can quickly convey to an operator how many banked MWh are available (as a result of previous CPL operation), and when an opportunity to profitably peak-fire the assets arises (e.g., when electricity prices are high enough to justify peak-firing, as can be ascertained from the peak price indicator 1824 on the day-ahead planning screen).

It is to be appreciated that the metrics illustrated in the example display screens described above are not intended to be limiting, and that other suitable metrics and display formats can be generated by the dispatch optimization system 402 in various embodiments. For example, for some power-generating systems the same amount of parts-life saved under different operating or ambient conditions can have different associated costs (e.g., different amounts of fuel consumption, etc.) due to nonlinearities, dependence on ambient conditions, or other factors. To account for this variation in life-saving costs, the computed additional costs of CPL operation under current ambient conditions can be divided by the associated amount of parts-life saved in terms of peak MWhs to produce a $/MWh value. Smaller values of this $/MWh value mean that additional MWh can be banked less expensively; accordingly, this value can be used as a guide for identifying suitable CPL opportunities. The heat-rate marginal costs at peak-fire can also be added to this $/MWh value to yield the net marginal cost of peak operation. As with other example metrics illustrated in FIG. 20, this $/MWh CPL cost and the net marginal cost of peak-firing can be tracked and accumulated over time.

In another example, the system 402 can guide selection of suitable peak-fire periods by generating an incremental cost as a function of peak MWh (or fired hours at peak capacity), and plotting this incremental cost on the same horizontal axis with a sorted list of electricity price, such that the highest electricity prices coincide with the lowest incremental CPL costs (i.e., the second curve is above the first). In such embodiments, the system can allow the user to enter a threshold value (e.g., depending on the risk appetite) as a minimum separation between the two curves that indirectly specifies the amount of peak MWh the user wishes to bank during the maintenance interval as well as a minimum price at which these MWh ought to be dispatched. If real-time electricity price data is provided to the dispatch optimization system 402 (e.g., from an electricity market website or another source), the system 402 can automatically initiate control of peak-fire operation in response to determining that the current electricity price is equal to or greater than this minimum price.

In a manual control (i.e., advisory only) example of peak-fire guidance, the system may render a current per-unit cost of the peak MWh bank (and/or its projection over a time horizon) that can help the user to decide whether to peak-fire their assets. If electricity price forecasts are available, then the smallest electricity price at which peak-firing is advisable can be recommended based on expected total MWh credits that are banked during the operating horizon.

In the examples described above, the target life used as a constraint for the iterative analysis is assumed to be a constant value. However, in some embodiments the profile generation component 406 can be configured to solve the maximization problem using the target life itself as another variable (in addition to the power output MW and the operating temperature T). In such embodiments, the user interface component 408 can allow the user to define a maximum amount of acceptable deviation from the baseline target life (which may be based on a customer service agreement with the equipment manufacturer or other maintenance provider). This user-defined deviation represents a maximum change in the target life that the user considers acceptable. Alternatively, the user may define upper and lower limits on the target life, instructing the dispatch optimization system 402 that the target life for the recommended profile is to remain between these upper and lower boundaries. When the profile generation component 406 performs the iterative analysis described above, rather than terminating the iterative analysis when the estimated FHH is approximately equal to the fixed target life, iterations of the inner and outer loop processing continue until a profit-maximizing operating profile is found having a target life that is within the target life parameters defined by the user. In some embodiments, the profile generation component 406 may generate multiple operating profiles having respective different target lives that are within the acceptable target life range defined by the user, and select the profile that yields the highest profit from among the multiple profiles, thereby allowing the target life to act as a variable together with the power output and operating temperature.

In some embodiments, the computational burden associated with performing multiple iterations of the inner loop processing can be further reduced by parallelizing the computational operations. For example, for a maintenance interval comprising 32,000 hours, the profile generation component 406 may divide the maintenance interval into substantially equal sections (e.g., 32 1000-hour sections, or other suitable segmentations of the maintenance interval) and perform the hourly profit maximization processing for the sections substantially simultaneously using parallel processing. The profit maximization processing can be parallelized in this manner since the inner loop comprises disjoint optimization problems (that is, the solution to the maximization problem for a given hour of the maintenance interval does not depend on maximization solutions found for other hours).

In another example processing scenario, the forecast data 710 can be used to run different instances of the optimization problem to account for variability in data. As an example of this approach, the inner and outer loop processing may be conducted such that only CPL opportunities in the forecast interval are consider in the optimization. Then, each iteration of the outer loop can correspond to a certain optimal peak-fire capability. This can enable the generation of an incremental cost curve as a function of peak-fire hours or MWHr.

Embodiments of the dispatch optimization system 402 described herein can serve as a tool for long-term planning of plant asset operation by identifying optimal peak-fire and CPL operation opportunities determined to substantially maximize profit generated by one or more plant assets over a maintenance interval. During real-time operation within the maintenance interval, the system 402 can assist with day-ahead and real-time planning and operation of the assets by leveraging real-time conditions and historical operation data to dynamically refine the long-term plan, and to present meaningful information that guides profitable operation of the assets. In this way, the system helps plant managers and operators to utilize the full value potential of their plant assets while satisfying target life requirements. The techniques implemented by the dispatch optimization system 402 allow these substantially optimized operating profiles and metrics to be calculated with relatively low computational overhead despite long operating horizons over which the optimization problem must be run.

FIGS. 21-24 illustrate methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 21:
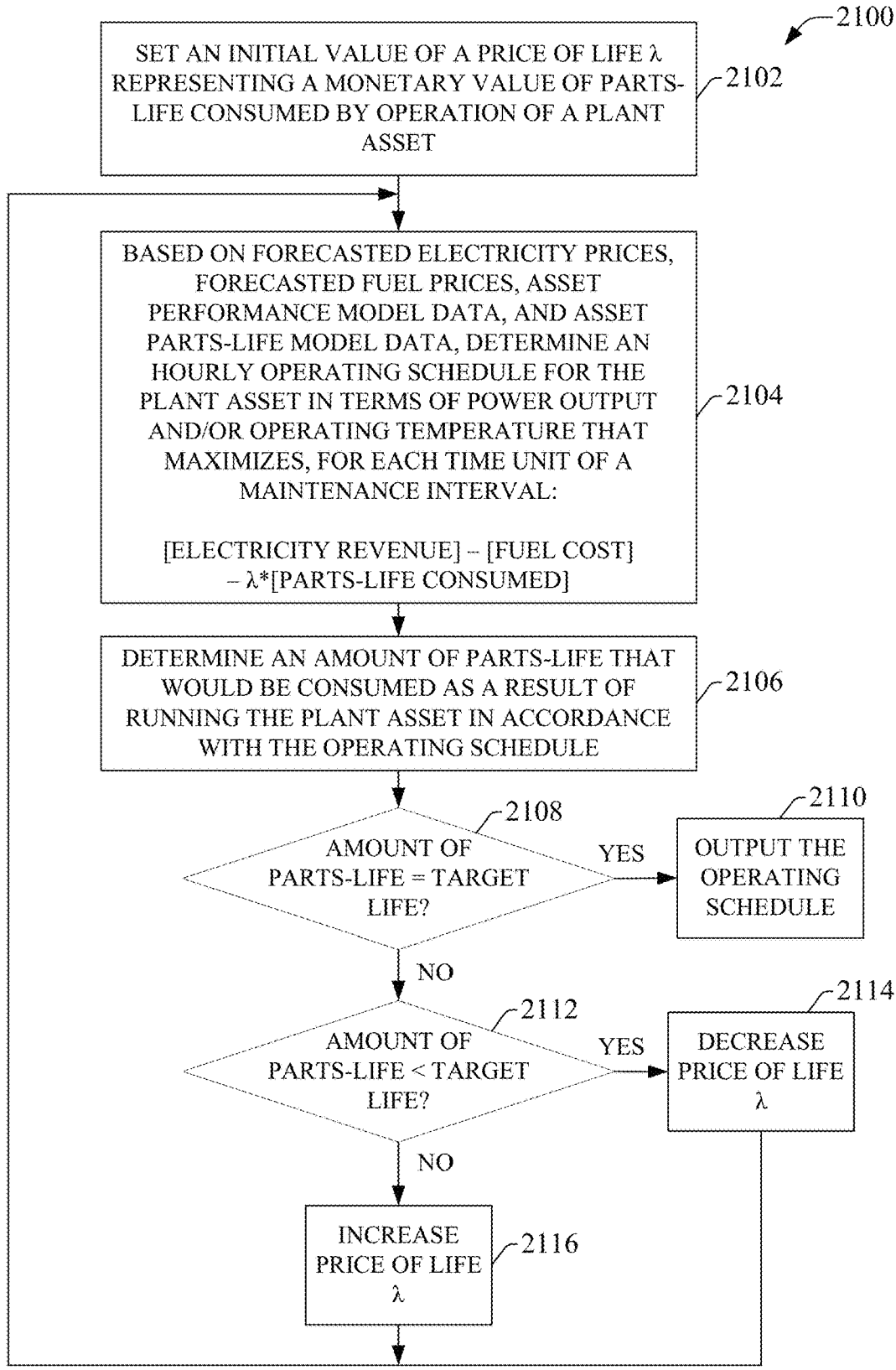
FIG. 21 is a flowchart of an example methodology for generating a profit-maximizing operating schedule or profile for a plant asset.

FIG. 21 illustrates an example methodology 2100 for generating a profit-maximizing operating schedule or profile for a plant asset. Initially, at 2102, an initial value of a price of life $\lambda$ is set, where the price of life $\lambda$ represents a monetary value of parts-life consumed by operation of a plant asset (e.g., one or more gas turbines or other power-generating plant assets). At 2104, based on forecasted electricity prices, forecasted fuel prices, performance model data for the plant asset, and parts-life model data for the plant asset, an hourly operating schedule for the plant asset is determined in terms of power output and/or operating temperature (and/or other operating variables) that substantially maximizes, for each time unit of a maintenance interval, a profit value given by

[Electricity Revenue]−[Fuel Cost]−$\lambda$*[Parts-Life Consumed]

For scenarios in which the operating schedule is to be found in terms of both plant output MW and operating temperature T, the profit to be maximized for each time unit can be given by equation (2) above. However, if the operating schedule is to be found in terms of other variables, other suitable profit calculations formulas defined in terms of such other variables can be used. In all cases, the profit calculation considers the cost of parts-life consumed (the product of the price of life value $\lambda$ and the calculated amount of parts-life consumed as a function of the operating variables). Step 2104, which can be considered an inner loop of an overall iterative problem solving process, may require multiple iterations to find the maximum profit for each time unit of the maintenance interval, depending on the number of operating variables (e.g., power output MW, operating temperature T, etc.) that are to be defined in the operating schedule.

At 2106, an amount of parts-life that would be consumed as a result of running the plant asset in accordance with the operating schedule obtained in step 2104 is determined. The parts-life that would be consumed can be determined, for example, based on parts-life model data for the plant asset, which defines the estimated amount of parts-life consumed by the asset as a function of power output MW and/or operating temperature T (or other operating variables).

At 2108 a determination is made as to whether the amount of consumed parts-life calculated at step 2106 is equal to a target life for the asset (within a defined tolerance). If the amount of parts-life does not equal the target life 1108 (NO at step 2108), the methodology proceeds to step 2112, where a determination is made as to whether the amount of parts-life determined at step 2106 is less than the target life. If the amount of parts-life is less than the target life (YES at step 2112), the methodology proceeds to step 2114, where the price of life value $\lambda$ is increased. Alternatively, if the amount of parts-life is not less than the target life (NO at step 2112), the methodology proceeds to step 2116, where the price of life value $\lambda$ is increased. After either decreasing or increasing the price of life value $\lambda$ at steps 2114 or 2116, respectively, the methodology returns to step 2104, and another operating schedule is determined using the updated value of the price of life $\lambda$. Steps 2106, 2108, 2112, 2114, and 2116 can be considered an outer loop of the overall iterative schedule determination process.

Steps 2104, 2106, 2108, 2112, 2114, and 2116 are repeated until a determination is made at step 1208 that the amount of parts-life is equal to the target life (within the defined tolerance). When the amount of parts-life is equal to the target life (YES at step 2108), the methodology proceeds to step 2110, where the most recent operating schedule determined at step 2104 is output. In some embodiments, the operating schedule can be output as a report or otherwise rendered in a format that can be reviewed by a user. Alternatively, in some embodiments the operating schedule can be exported to a plant asset control system so that operation of the asset will be controlled in accordance with the schedule.

Figure 22:
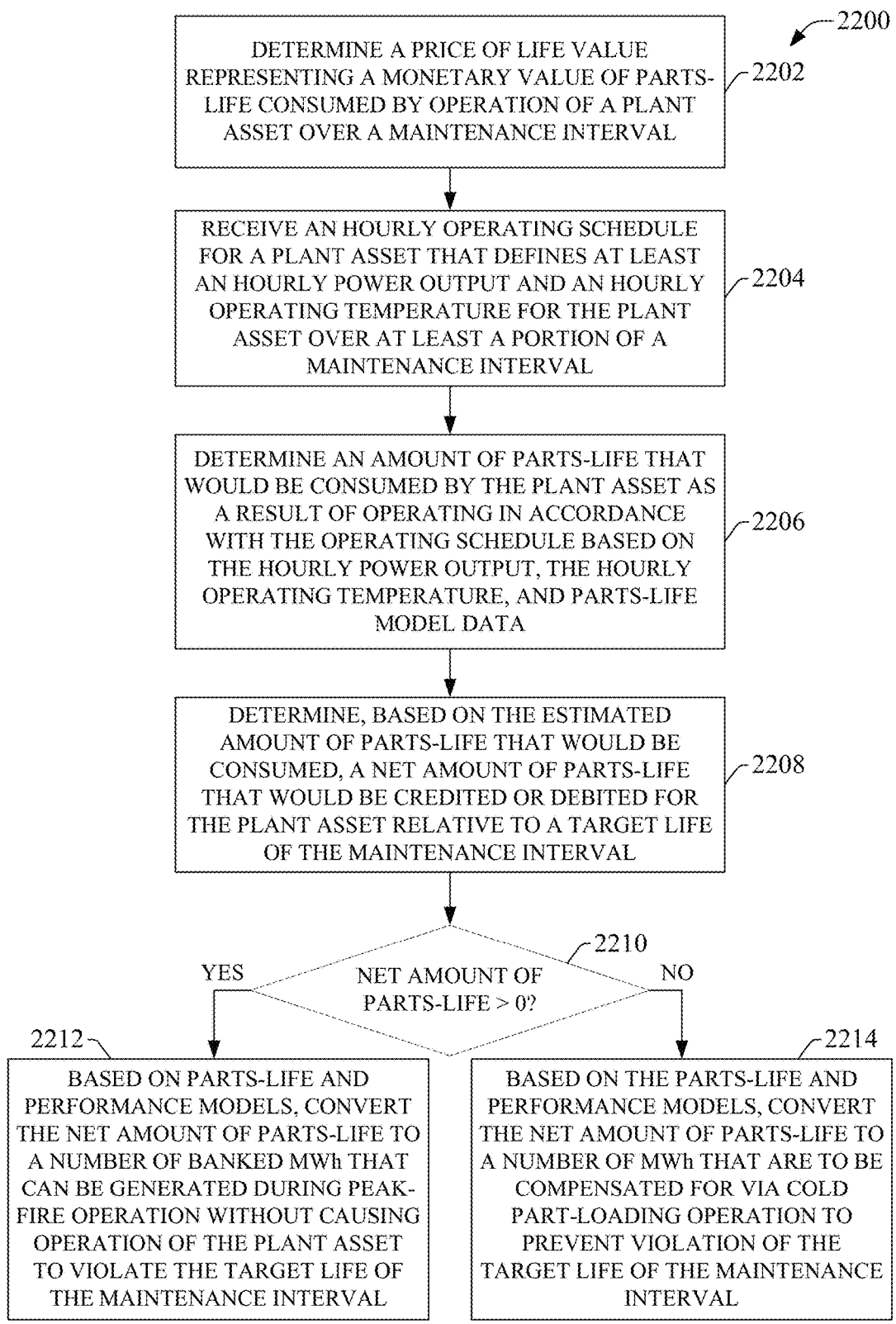
FIG. 22 is a flowchart of an example methodology for determining parts-life credits and deficits relative to a target life for one or more power-generating plant assets.

FIG. 22 illustrates an example methodology 2200 for determining parts-life credits and deficits relative to a target life for one or more power-generating plant assets. Initially, at 2202, a price of life value representing a monetary value of parts-life consumed by operation of a plant asset over a maintenance interval is determined. At 2204, an hourly operating schedule or profile for the plant asset is received. The operating schedule defines at least an hourly power output and an hourly operating temperature for the plant asset over at least a portion of a maintenance interval. In some embodiments, the price of life value obtained at step 2202 and the hourly operating schedule obtained at step 2204 can be derived using methodology 2100 described above (e.g., through iterations of the inner and outer loop processing carried out by the profile generation component 406). Alternatively, the operating schedule can be a user-defined schedule provided by a user.

At 2206, an amount of parts-life that would be consumed by the plant asset as a result of operating the asset in accordance with the operating schedule obtained at step 2204 is determined. This amount of parts-life can be determined, for example, using parts-life model data for the plant asset together with the hourly power output and operating temperatures defined by the operating schedule. At 2208, based on the estimated amount of parts-life determined at step 2206, a net amount of parts-life that would be created or debited for the plant asset relative to a target life of the maintenance interval is determined. For example, since CPL operation causes parts-life to be consumed more slowly relative to base load operation, CPL hours identified by the operating schedule will create parts-life credits. Conversely, since peak-fire operation causes parts-life to be consumed more quickly, peak-fire hours identified by the operating schedule will yield parts-life create parts-life deficits. The net of parts-life credits and deficits yields the net amount of parts-life that will be credited or debited as a result of operation in accordance with the operating schedule.

At 2210, a determination is made as to whether the net amount of parts-life determined at step 2208 is greater than 0, indicating a net parts-life credit (or bank). If the net amount of parts-life is greater than 0 (YES at step 2210), the methodology proceeds to step 2212, where, based on the parts-life and performance models, the net amount of parts-life is converted to a number of banked MWh that can be generated during peak-fire operation without causing operation of the plant asset to violate the target life of the maintenance interval. Alternatively, if the net amount of parts-life is not greater than 0 (NO at step 2210), the methodology moves to step 2214, where, based on the parts-life and performance models, the net amount of parts-life is converted to a number of MWh that are to be compensated for via cold part-loading operation in order to prevent violation of the target life of the maintenance interval. In some embodiments, the net amount of parts-life can be updated during operation based on actual operation data (e.g., actual hourly values of power output MWh and operating temperature T) as well as updated forecasted market and/or ambient data. This running net amount of parts-life can also be plotted graphically over time to show the number of MWh available for peak-firing, or the number of MWh that must be compensated for by CPL operation in order to satisfy the target life constraint for the current maintenance interval.

Figure 23:
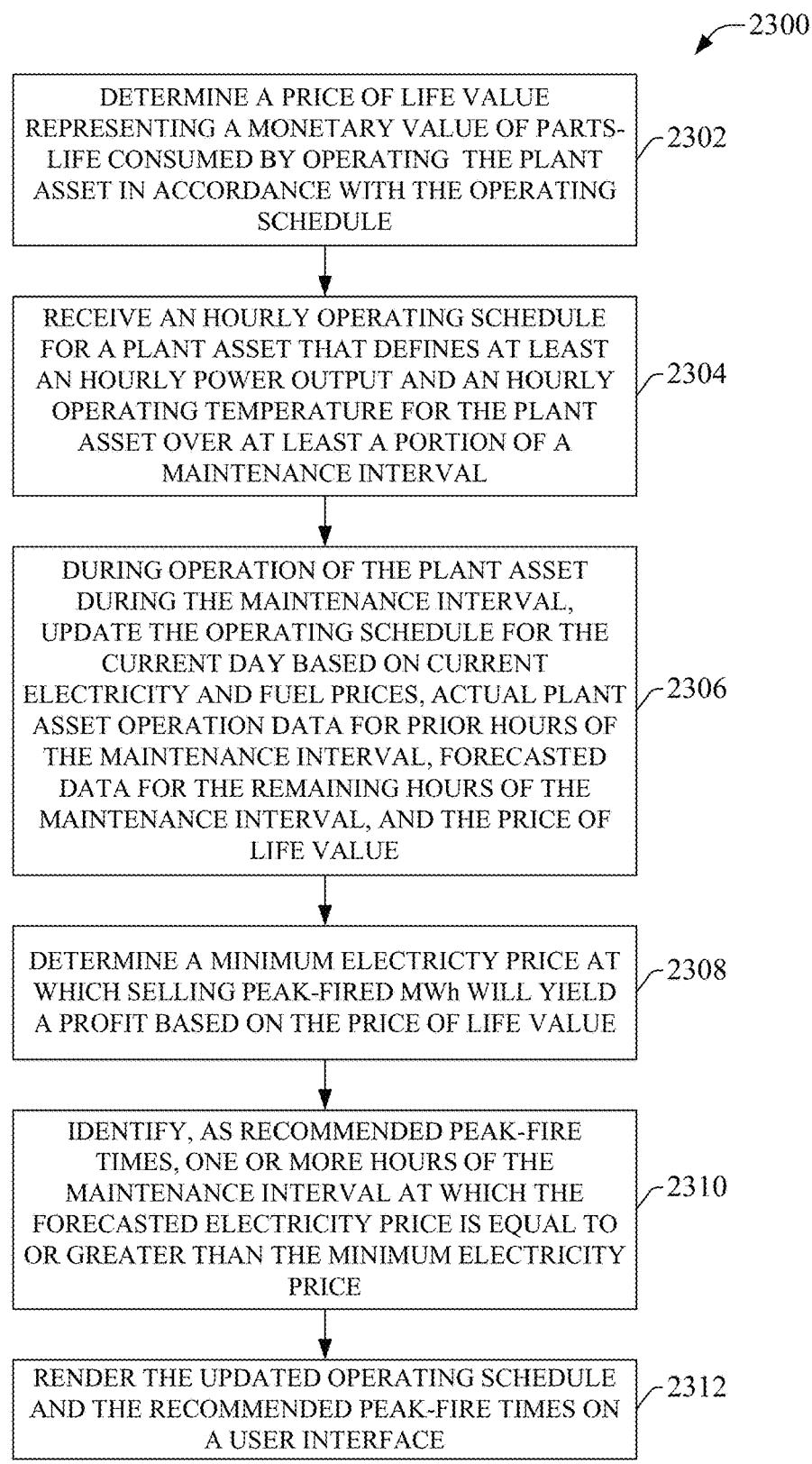
FIG. 23 is a flowchart of an example methodology for identifying suitable periods during which to profitably peak-fire power-generating plant assets.

FIG. 23 illustrates an example methodology 2300 for identifying suitable periods during which to profitably peak-fire power-generating plant assets. Initially, at 2302, a price of life value representing a monetary value of parts-life consumed as a result of operating a plant asset over a maintenance interval is determined. In some embodiments, the price of life value can be derived using methodology 2100 described above (e.g., through iterations of the outer loop processing carried out by the profile generation component 406). At 2304, an hourly operating schedule or profile for a plant asset is received. The operating schedule defines at least an hourly power output and an hourly operating temperature for the plant asset over at least a portion of a maintenance interval, including the day ahead or the current day. In some embodiments, the hourly operating schedule obtained at step 2302 can be derived using methodology 2100 described above (e.g., through iterations of the inner loop processing carried out by the profile generation component 406) based on the price of life value determined at step 2302. Alternatively, the operating schedule can be a user-defined schedule provided by a user.

At 2306, during operation of the plant asset during the maintenance interval, the portion of the operating schedule corresponding to the current day is updated based on current fuel and electricity prices, actual operation data for the plant asset (e.g., historical hourly values of the power output and operating temperature for past hours of the maintenance interval), forecasted fuel and electricity prices for the remaining hours of the maintenance interval, and the price of life value determined at step 2302. For example, the inner loop processing described above (e.g., step 2104 of methodology 2100) can be re-executed using the current and historical data for the current day in place of forecasted data for past hours of the maintenance interval, and updated forecast data for the remaining hours of the maintenance interval.

In some embodiments, the price of life value can be updated periodically via step 2302, and the operating schedule can similarly be updated periodically via step 2306 but at a higher frequency than the updating of the price of life value. For example, the price of life value may be updated once a day, while the operating schedule may be updated every hour or every few hours throughout the day to reflect updated forecasts or deviations in the operation of the plant asset from planned operation.

At 2308, a minimum electricity price at which selling peak-fired MWh will yield a profit is determined based on the price of life value obtained at step 2302. At 2310, one or more hours of the maintenance interval at which the forecasted electricity price is equal to or greater than the minimum electricity price determined at step 2308 are identified as a recommended peak-fire times. At 2312, the updated operating schedule and the recommended peak-fire times are rendered on a user interface.

Figure 24:
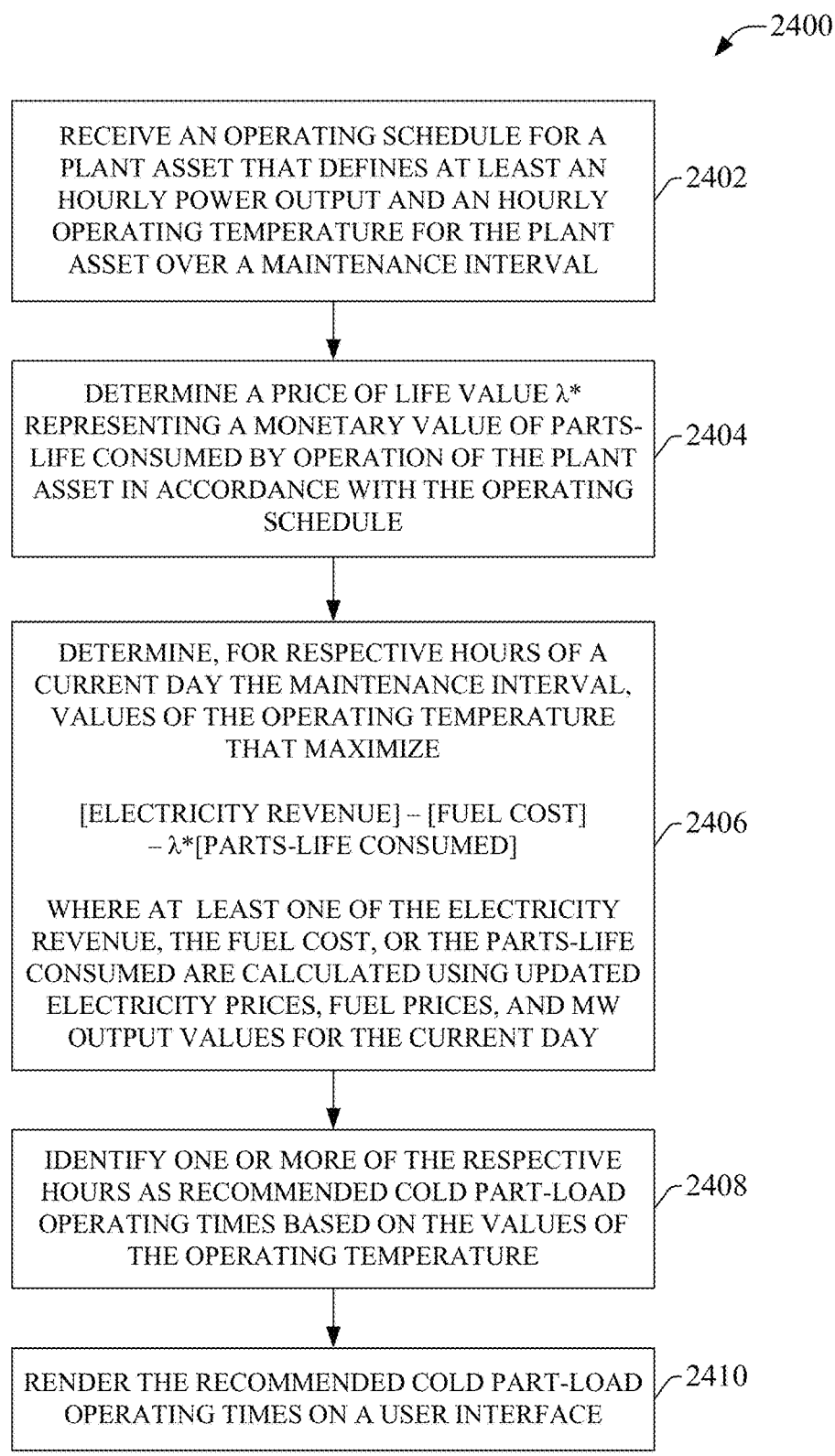
FIG. 24 is a flowchart of an example methodology for identifying suitable periods during which to cold part-load power-generating plant assets in a cost-efficient manner.

FIG. 24 illustrates an example methodology 2400 for identifying suitable periods during which to cold part-load power-generating plant assets in a cost-efficient manner. Initially, at 2402, an hourly operating schedule for a plant asset is received that defines at least an hourly power output and an hourly operating temperature for the plant asset over a maintenance interval. At 2404, a price of life value $\lambda^*$ is determined, where the price of life value represents a monetary value of parts-life consumed by operation of the plant asset in accordance with the operating schedule received at step 2402. In one or more embodiments, the operating schedule and the price of life value $\lambda^*$ can be determined using methodology 2100 (e.g., executed by profile generation component 406), based on forecasted electricity and fuel prices, asset performance model data, and asset parts-life model data.

At 2406, for respective hours of a current day of the maintenance interval, values of the operating temperature are determined that maximize or substantially maximize $$[\text{Electricity Revenue}] - [\text{Fuel Cost}] - \lambda^*[\text{Parts-Life Consumed}]$$

where at least one of the electricity revenue, the fuel cost, or the parts-life consumed are calculated using updated electricity and fuel prices, as well as actual power output values generated by the plant asset for prior hours of the current day.

At 2408, one or more of the respective hours of the current day are identified as recommended cold part-load operating times based on the values of the operating temperature obtained at step 2406. For example, hours for which the operating temperatures obtained at step 2406 are below baseline (e.g., hot load) temperatures can be identified as suitable cold part-load hours. In some embodiments, the recommended cold part-load operating hours may also be correlated with the forecasted fuel price information in order to identify a subset of the recommended cold part-load hours corresponding to one or more lowest fuel prices. This subset of recommended hours may be flagged as hours that are best suited for cold part-load operation. At 2410, the recommended cold part-load operation times are rendered on user interface. In some embodiments, operation of the plant asset may be automatically controlled in accordance with the recommended cold part-load hours, such that the plant asset's operating temperature is automatically regulated in accordance with the results of step 2408.

Figure 25:
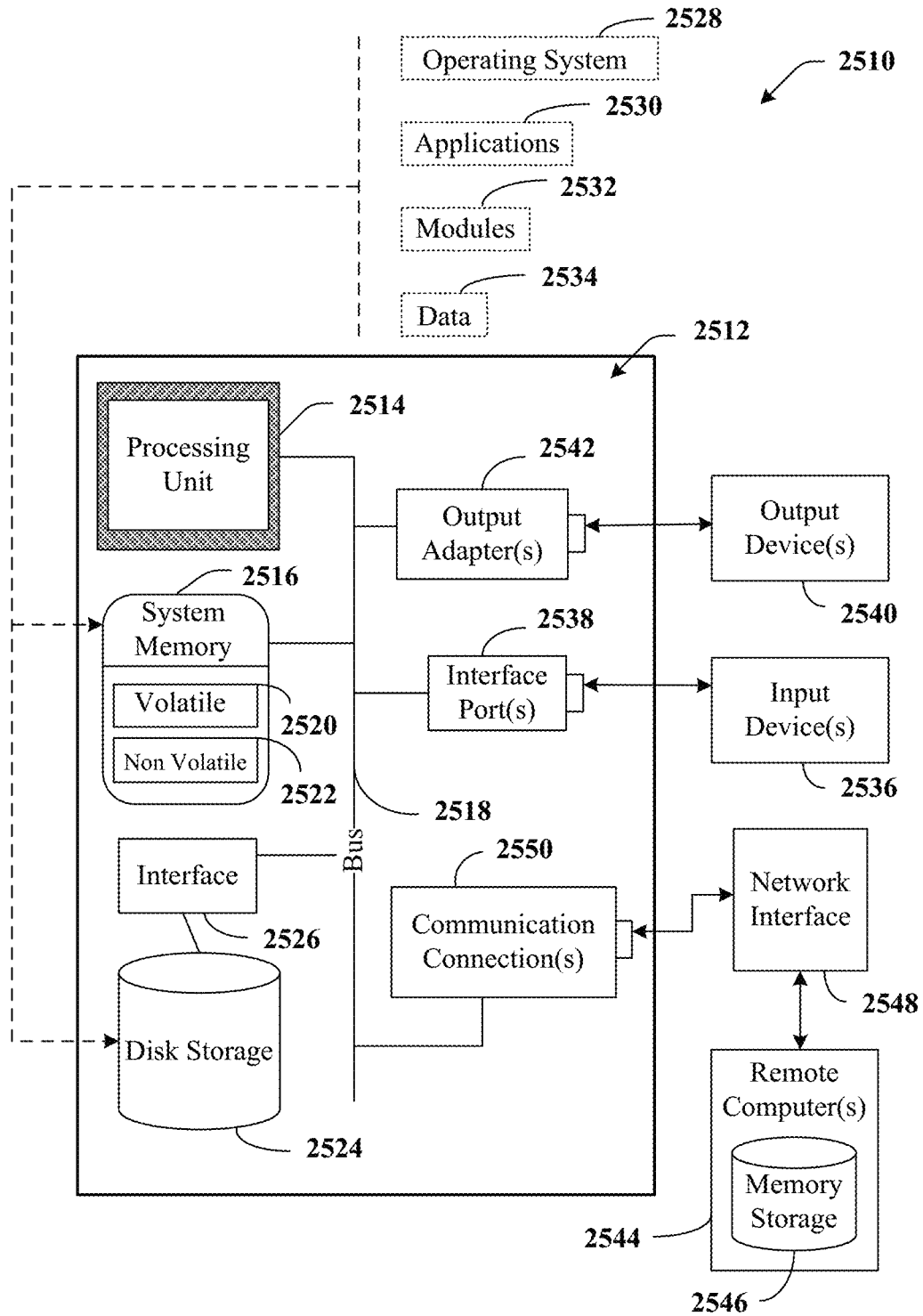
FIG. 25 is an example computing environment.
Figure 26:
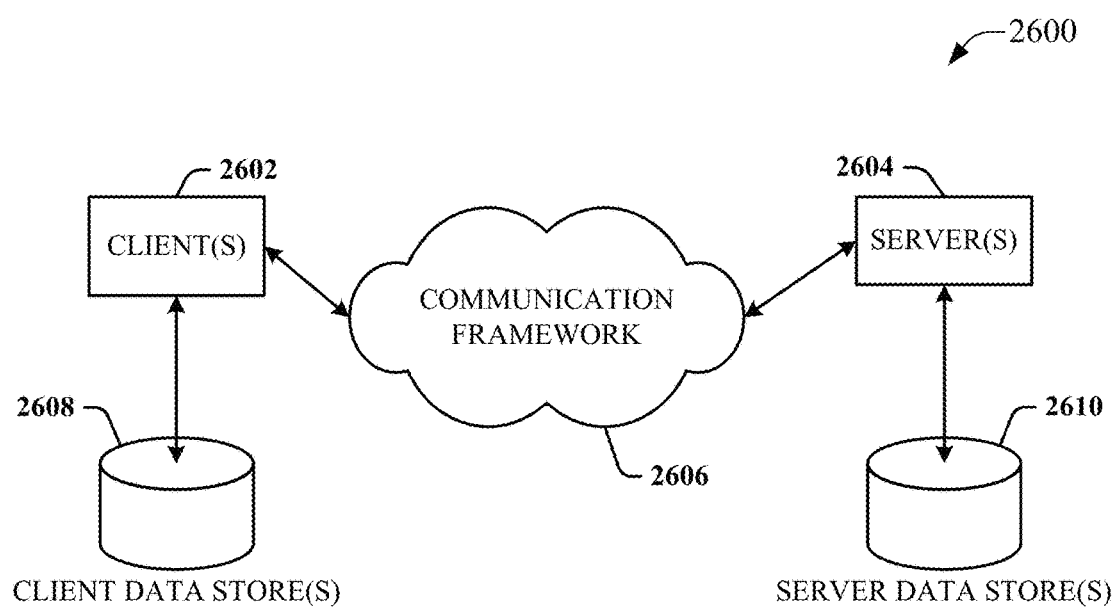
FIG. 26 is an example networking environment.

In order to provide a context for the various aspects of the disclosed subject matter, FIGS. 25 and 26 as well as the following discussion are intended to provide a brief, general description of a suitable environment in which the various aspects of the disclosed subject matter may be implemented.

With reference to FIG. 25, an example environment 2510 for implementing various aspects of the aforementioned subject matter includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Multi-core microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable PROM (EEPROM), or flash memory. Volatile memory 2520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2512 also includes removable/non-removable, volatile/non-volatile computer storage media. FIG. 25 illustrates, for example a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2524 to the system bus 2518, a removable or non-removable interface is typically used such as interface 2526.

It is to be appreciated that FIG. 25 describes software that acts as an intermediary between users and the basic computer resources described in suitable operating environment 2510. Such software includes an operating system 2528. Operating system 2528, which can be stored on disk storage 2524, acts to control and allocate resources of the computer 2512. System applications 2530 take advantage of the management of resources by operating system 2528 through program modules 2532 and program data 2534 stored either in system memory 2516 or on disk storage 2524. It is to be appreciated that one or more embodiments of the subject disclosure can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapters 2542 are provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the system bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

FIG. 26 is a schematic block diagram of a sample computing environment 2600 with which the disclosed subject matter can interact. The sample computing environment 2600 includes one or more client(s) 2602. The client(s) 2602 can be hardware and/or software (e.g., threads, processes, computing devices). The sample computing environment 2600 also includes one or more server(s) 2604. The server(s) 2604 can also be hardware and/or software (e.g., threads, processes, computing devices). The servers 2604 can house threads to perform transformations by employing one or more embodiments as described herein, for example. One possible communication between a client 2602 and servers 2604 can be in the form of a data packet adapted to be transmitted between two or more computer processes. The sample computing environment 2600 includes a communication framework 2606 that can be employed to facilitate communications between the client(s) 2602 and the server(s) 2604. The client(s) 2602 are operably connected to one or more client data store(s) 2608 that can be employed to store information local to the client(s) 2602. Similarly, the server(s) 2604 are operably connected to one or more server data store(s) 2610 that can be employed to store information local to the servers 2604.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    receiving, by a system comprising at least one processor, operating profile data for one or more power-generating assets defining values of one or more operating variables for respective time units of a life cycle;
    determining, by the system for a first subset of the respective time units of the life cycle corresponding to a first operating mode that produces parts-life credits relative to a target life, an amount of parts-life credited relative to the target life based on the operating profile data and parts-life model data for the one or more power-generating assets;
    determining, by the system for a second subset of the respective time units of the life cycle corresponding to a second operating mode that consumes the parts-life credits relative to the target life, an amount of parts-life consumed relative to the target life based on the operating profile data and the parts-life model data;
    determining, by the system, an amount of banked parts-life at a current time of the life cycle based on a net of the amount of parts-life credited and the amount of parts-life consumed;
    converting, by the system, the amount of banked parts-life to an amount of available power output capable of being generated by the second operating mode during the life cycle without violating the target life;
    determining, by the system based on the price of life value, a minimum electricity price at which selling the available power output will yield a profit;
    in response to determining that a current electricity price is equal to or greater than the minimum electricity price, automatically initiating peak-fire operation of the one or more power-generating assets; and
    rendering, by the system, the amount of available power output on an interface display.

2. The method of claim 1, further comprising:
    determining, by the system, a price of life value representing a cost per unit of the banked parts-life for the one or more power-generating assets, wherein the price of life value is one of a non-vector value or a vector value; and
    rendering, by the system on the interface display or another interface display, the minimum electricity price.

3. The method of claim 2, further comprising:
    identifying, by the system, one or more time units of the life cycle during which the second operating mode is recommended based on the minimum electricity price and forecasted electricity price data;
    rendering, by the system on the interface display or another interface display, the one or more time units during which the second operating mode is recommended, and
    rendering, by the system on the interface display or another interface display, a submit button, wherein the submit button enables another execution sequence based on at least one of an updated minimum electricity price and an updated forecasted electricity price.

4. The method of claim 3, further comprising:
    plotting, by the system on the interface display or another interface display, a cumulative value of the amount of available power output over time.

5. The method of claim 1, further comprising:
    determining, by the system, a price of life value representing a cost per unit of the banked parts-life for the one or more power-generating assets;
    identifying, by the system, one or more time units of the life cycle during which the first operating mode is recommended based on the price of life value, forecasted electricity price data, forecasted fuel price data, performance model data that models fuel consumption for the one or more power-generating assets, and parts-life model data that models parts-life consumption for the one or more power-generating assets;
    rendering, by the system on the interface display or another interface display, the one or more time units during which the first operating mode is recommended, and
    providing at least one user interface component configured to generate at least one user-defined constraint for display on the interface display.

6. The method of claim 5, wherein the identifying the one or more time units during which the first operating mode is recommended comprises identifying, for respective time units of the life cycle, an operating temperature T for the one or more power-generating assets that maximizes or substantially maximizes $$\text{ElectricityPrice} * MW - \text{FuelCost} * \text{FuelUsed}(MW, T, Amb) - \lambda * \text{FHH\_Consumed}(MW, T, Amb)$$

where
    ElectricityPrice is a forecasted or actual price of power at the time unit,
    MW is a forecasted or actual value of the power output for the time unit,
    FuelCost is a forecasted or actual price of fuel for the time unit,
    Amb is one or more values of one or more ambient conditions for the time unit,
    FuelUsed(MW, T, Amb) is a forecasted amount of fuel consumed for the time unit as a function of MW, T, and Amb,
    $\lambda$ is the price of life value, and
    FHH_Consumed(MW, T, Amb) is a forecasted amount of parts-life created or consumed for the time unit as a function of MW, T, and Amb, and
        wherein the user-defined constraints comprise operating data corresponding to at least one of a duct-burner, an evaporative cooler, and a chiller.

7. The method of claim 6, further comprising controlling, by the system, operation of the one or more power-generating assets in accordance with values of the operating temperature T determined for the respective time units,
    wherein the interface display further comprises a day-ahead capacity display screen, and
    wherein the day-ahead capacity display screen displays day-ahead planning information.

8. The method of claim 6, further comprising:
    updating, by the system, the price of life value on a periodic basis based on historical operation data for the one or more plant assets for past time units of the life cycle, forecasted electricity price data and gas cost data for remaining time units of the life cycle, and forecasted ambient data for the remaining time units of the life cycle to yield an updated price of life value; and
    updating, by the system for the respective time units, the operating temperature T multiple times during a day of the life cycle based on the updated price of life value.

9. The method of claim 1, wherein the receiving the operating profile data comprises:
    selecting, by the system, a price of life value representing a cost per unit of the banked parts-life for the one or more power-generating plant assets;

determining, by the system for respective time units of the life cycle, provisional values of the one or more operating variables that maximize or substantially maximize profit values based on the price of life value, the one or more operating variables comprising at least one of power output or operating temperature;

determining, by the system, a predicted amount of consumed parts-life over the life cycle for the one or more power-generating assets based on the provisional values of the one or more operating variables; and in response to determining that the predicted amount of consumed parts-life does not violate the target life, generating, by the system, the operating profile data based on the provisional values of the one or more operating variables.

10. A system, comprising:
at least one real-time data acquisition component;
at least one network interface, the at least one network interface configured to received real-time data from the at least one real-time data acquisition component;
at least one system bus communicatively coupled to the at least one network interface;
a memory that stores executable components, the memory communicatively coupled to the at least one system bus;
a processor, operatively coupled to the memory and the at least one system bus, that executes the executable components, the executable components comprising:
a profile generation component configured to generate operating profile data for the one or more power-generating assets, wherein the operating profile data comprises values of one or more operating variables for respective time units of a maintenance interval;
a parts-life metric component configured to
  determine, for a first subset of the respective time units of the maintenance interval corresponding to a first mode of operation that produces parts-life credits relative to a target life based on the operating profile data and parts-life model data for the one or more power-generating assets, a number of parts-life credits generated by the first mode of operation, wherein the parts-life credits represent an amount of the parts-life that can be consumed by a second mode of operation that consumes the parts-life credits during the maintenance interval without violating a constraint relative to the target life,
  determine, for a second subset of the respective time units of the maintenance interval corresponding to the second mode of operation based on the operating profile data and the parts-life model data, a number of parts-life debits generated by the second mode of operation, wherein the parts-life debits represent an amount of parts-life to be compensated for by the first mode of operation during the maintenance interval to prevent violation of the constraint relative to the target life,
  determine an amount of banked parts-life at a current time of the maintenance interval based on a balance of the number of parts-life credits and the number of parts-life debits, and
  determine, by the system based a the price of life value, a minimum electricity price at which selling the available power output will yield a profit;
  in response to determining that a current electricity price is equal to or greater than the minimum electricity price, automatically initiate peak-fire operation of the one or more power-generating assets; and
  convert the amount of banked parts-life to an amount of banked power output available for the second mode of operation during the maintenance interval that will not violate the constraint relative to the target life; and
a user interface component configured to render the amount of banked power output available for the second mode of operation on an interface display.

11. The system of claim 10, wherein
the profile generation component is further configured to determine a price of life value representing a cost per unit of the banked parts-life for the one or more power-generating assets, the price of life value being one of a non-vector value or a vector value,
the parts-life metric component is further configured to determine a minimum electricity price or a range of electricity prices at which selling the banked power output will yield a profit, and
the user interface component is further configured to render the minimum electricity price or the range of electricity prices on the interface display or another interface display, and
wherein the system performs automatic actions in response to at least one of the price of life value, the minimum electricity price, the banked power output, the non-vector value, and the vector value.

12. The system of claim 11, wherein
the profile generation component is further configured to identify one or more time units of the maintenance profile during which the second mode of operation is recommended based on the minimum electricity price and predicted electricity price data, and
the user interface component is further configured to render, on the interface display or another interface display, one or more graphical indications identifying the one or more time units during which the second mode of operation is recommended,
wherein the at least one network interface encompasses at least one local-area network (LAN), and
wherein the at least one LAN comprises at least one of a Fiber Distributed Data Interface (FDDI), a Copper Distributed Data Interface (CDDI), an Ethernet/IEEE 802.3, and a Token Ring/IEEE 802.5.

13. The system of claim 10, wherein
the profile generation component is further configured to determine a price of life value representing a cost per unit of the banked parts-life for the one or more power-generating assets, and
identify one or more time units of the maintenance profile during which the first mode of operation is recommended based on the price of life value, predicted electricity price data, predicted fuel price data, performance model data that models fuel consumption for the one or more power-generating assets, and parts-life model data that models parts-life consumption for the one or more power-generating assets, and
the user interface component is further configured to render, on the interface display or another interface display, one or more graphical indications identifying the one or more time units during which the first mode of operation is recommended,
wherein the real-time data comprises at least one of weather forecast data, electricity market data, and maintenance database data.

14. The system of claim 13, wherein the profile generation component is configured to identify the one or more time units during which the first mode of operation is recommended by identifying, for respective time units of the maintenance interval, an operating temperature T for the one or more power-generating assets that maximizes or substantially maximizes $$\text{ElectricityPrice} * \text{MW} - \text{FuelCost} * \text{FuelUsed}(\text{MW}, \text{T}, \text{Amb}) - \lambda * \text{FHH\_Consumed}(\text{MW}, \text{T}, \text{Amb})$$

where
ElectricityPrice is a forecasted or actual price of power at the time unit,
MW is a forecasted or actual value of the power output for the time unit,
FuelCost is a forecasted or actual price of fuel for the time unit,
Amb is one or more values of one or more ambient conditions over time,
FuelUsed(MW, T, Amb) is a forecasted amount of fuel consumed for the time unit as a function of MW, T, and Amb,
$\lambda$ is the price of life value, and
FHH_Consumed(MW, T, Amb) is a forecasted amount of parts-life created or consumed for the time unit as a function of MW, T, and Amb,
  wherein the profile generation component is configured to solve at least one maximization problem using the target life as a variable.

15. The system of claim 14, further comprising a control interface component configured to control operation of the one or more power-generating assets in accordance with values of the operating temperature T determined for the respective time units,
  wherein the at least one system bus comprises at least one of an 8-bit bus, an Industrial Standard Architecture (ISA), a Micro-Channel Architecture (MSA), an Extended ISA (EISA), an Intelligent Drive Electronics (IDE), a VESA Local Bus (VLB), a Peripheral Component Interconnect (PCI), and a Universal Serial Bus (USB).

16. The system of claim 14, wherein the profile generation component is further configured to
  update the price of life value on a periodic basis based on historical operation data for the one or more power-generating assets for past time units of the maintenance interval, predicted electricity price data for remaining time units of the maintenance interval, and predicted ambient data for the remaining time units of the maintenance interval to yield an updated price of life value, and
  update, for the respective time units, the operating temperature T multiple times during a day of the maintenance interval based on the updated price of life value,
  wherein the processor comprises at least one of a multi-core microprocessor and a multiprocessor architecture.

17. The system of claim 10, wherein the profile generation component is configured to:
  select a price of life value representing a cost per unit of the banked parts-life for the one or more power-generating assets;
  determine, for respective time units of the life cycle, provisional values of the one or more operating variables that maximize or substantially maximize profit values based on the price of life value, wherein the one or more operating variables comprise at least one of power output or operating temperature;
  determine a predicted amount of consumed parts-life over the maintenance interval for the one or more power-generating assets based on the provisional values of the one or more operating variables; and
  in response to determining that the predicted amount of consumed parts-life does not violate the constraint relative to the target life, generate the operating profile data based on the provisional values of the one or more operating variables,
  wherein the system performs automatic actions, the automatic actions comprising implementing the second mode of operation.

18. A non-transitory computer-readable medium having stored thereon executable instructions that, in response to execution, cause a system comprising at least one processor to perform operations, the operations comprising:
  receiving operating profile data for one or more power-generating assets defining values of one or more operating variables for respective time units of a maintenance interval;
  determining, for a first subset of the respective time units of the maintenance interval corresponding to a first operating mode that credits parts-life relative to a target life for the one or more power-generating assets, an amount of parts-life credited relative to the target life based on the operating profile data and parts-life model data for the one or more power-generating assets;
  determining, for a second subset of the respective time units of the maintenance interval corresponding to a second operating mode that consumes parts-life relative to the target life for the one or more power-generating assets, an amount of parts-life consumed relative to the target life based on the operating profile data and the parts-life model data;
  determining an amount of banked parts-life at a current time of the maintenance interval based on a net of the amount of parts-life credited and the amount of parts-life consumed;
  determining an amount of available power output capable of being generated by the second operating mode during a remainder of the maintenance interval without violating the target life as a function of the amount of banked parts-life;
  determining, by the system based on a price of life value, a minimum electricity price at which selling the available power output will yield a profit;
  in response to determining that a current electricity price is equal to or greater than the minimum electricity price, automatically initiating peak-fire operation of the one or more power-generating assets; and
  displaying the amount of available power output on an interface display.

19. The non-transitory computer-readable medium of claim 18, wherein the operations further comprise:
  determining a price of life value representing a cost per unit of the banked parts-life for the one or more power-generating assets, wherein the price of life value is one of a non-vector value or a vector value;
  determining based on the price of life value, a minimum electricity price or a range of electricity prices at which selling the available power output will yield a profit; and
  displaying, on the interface display or another interface display, the minimum electricity price or the range of electricity prices,
  wherein receiving operating profile data comprises receiving operating profile data via at least one network interface, wherein the at least one network interface encompasses at least one local-area network (LAN), and wherein the at least one LAN comprises at least one of a Fiber Distributed Data Interface (FDDI), a Copper Distributed Data Interface (CDDI), an Ethernet/IEEE 802.3, and a Token Ring/IEEE 802.5.

20. The non-transitory computer-readable medium of claim 19, wherein the operations further comprise:

identifying one or more time units of the maintenance profile during which the second operating mode is recommended based on the minimum electricity price and forecast electricity price data; and displaying, on the interface display or another interface display, the one or more time units during which the first operating mode is recommended.

* * * * *